United States Patent
Arnoff et al.

(10) Patent No.: US 7,274,777 B2
(45) Date of Patent: Sep. 25, 2007

(54) SUBSTANTIALLY SYNCHRONOUS DEPOSIT OF MESSAGES INTO MULTIPLE COMMUNICATION MODALITIES

(75) Inventors: Mary S. Arnoff, Lawrenceville, GA (US); W. Todd Daniell, Marietta, GA (US); Larry G. Kent, Jr., Loganville, GA (US); Dale W. Malik, Dunwoody, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 535 days.

(21) Appl. No.: 10/747,823

(22) Filed: Dec. 29, 2003

(65) Prior Publication Data

US 2005/0147213 A1    Jul. 7, 2005

(51) Int. Cl.
*H04M 1/64* (2006.01)

(52) U.S. Cl. .............................. 379/88.22; 379/88.17; 379/93.24; 379/88.13

(58) Field of Classification Search ............ 379/88.13, 379/67.1, 88.17, 88.18, 88.22, 88.25, 908, 379/93.24, 93.09
See application file for complete search history.

(56) References Cited

U.S. PATENT DOCUMENTS

| | | | | |
|---|---|---|---|---|
| 5,740,231 A | * | 4/1998 | Cohn et al. | 379/88.22 |
| 6,487,278 B1 | * | 11/2002 | Skladman et al. | 379/88.13 |
| 6,732,151 B1 | * | 5/2004 | Tobias et al. | 709/206 |
| 7,136,461 B1 | * | 11/2006 | Swingle et al. | 379/88.13 |
| 2002/0077082 A1 | * | 6/2002 | Cruickshank | 455/413 |

\* cited by examiner

*Primary Examiner*—Fan Tsang
*Assistant Examiner*—Olisa Anwah
(74) *Attorney, Agent, or Firm*—Thomas, Kayden, Hostemeyer & Risley, LLP

(57) ABSTRACT

The present disclosure provides systems and methods for storing messages using multiple communication modalities, in which a first communication is received from a first communication system. The first communication system is configured to communicate using a first standard communication protocol. The first communication is converted to a second communication, which is compatible with a second standard communication protocol. The first communication and second communication are separately stored.

8 Claims, 31 Drawing Sheets

BellSouth® Internet Call Waiting

Send Waiting Caller to Another Telephone Number

A feature of Internet Call Waiting is the option to send the call to another number. For example, you can send it to your cellular phone or to your office. If you know the numbers, enter the information below. The information can be changed later using the Manage ICW feature. To skip this step, click Next.

List - Send Calls [Optional]

Name / Number fields (1404a–1404e, 1406a–1406e)

< Back    Next >

FIG. 14

SUBSTANTIALLY SYNCHRONOUS DEPOSIT OF MESSAGES INTO MULTIPLE COMMUNICATION MODALITIES

FIELD OF THE INVENTION

The present disclosure relates generally to communications and, more particularly, to communications in multiple communication modalities.

BACKGROUND

Recently, email and instant messaging (IM) have become commonplace in digital communications. Additionally, cellular telephones have also become ubiquitous in society. Thus, many people carry multiple devices, such as cellular telephones, email-enabled personal digital assistants (PDAs), etc. in order to keep abreast of all of their incoming communications.

In an effort to integrate these various communication systems (e.g., public switched telephone network (PSTN) systems, cellular telephone systems, email systems, etc.), various vendors have created "unified messaging systems." Those unified messaging systems provide a centralized repository, which stores messages such as, for example, telephone calls, email messages, etc. The centralized storage of messages provides users access to various communication modalities (e.g., email, voicemail, etc.) through a single user interface.

Unfortunately, the integration of the various communication systems comes at a significant cost to the vendors because, typically, the integration requires vendors to modify the various individual communication systems. For example, in order to create a unified messaging system that is compatible with both email and telephony, both the underlying architectures of the telephone system and email system are modified as the unified messaging platform is constructed. The modification of the underlying component systems results in a complex architecture that is susceptible to communication errors.

Thus, a heretofore-unaddressed need exists in the industry to address the aforementioned deficiencies and inadequacies.

SUMMARY

The present disclosure provides systems and methods for storing messages using multiple communication modalities.

Briefly described, in some embodiments, among others, a first communication is received from a first communication system. The first communication system is configured to communicate using a first standard communication protocol. The first communication is converted to a second communication, which is compatible with a second standard communication protocol. The first communication and second communication are separately stored. In some embodiments, among others, the first communication and the second communication are stored substantially synchronously at two separate communication systems.

Other systems, devices, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 14 is a diagram showing an embodiment of another user interface that can be presented to a user during the setup process of FIGS. 3 through 7.

DETAILED DESCRIPTION OF THE EMBODIMENTS

Figure 1:
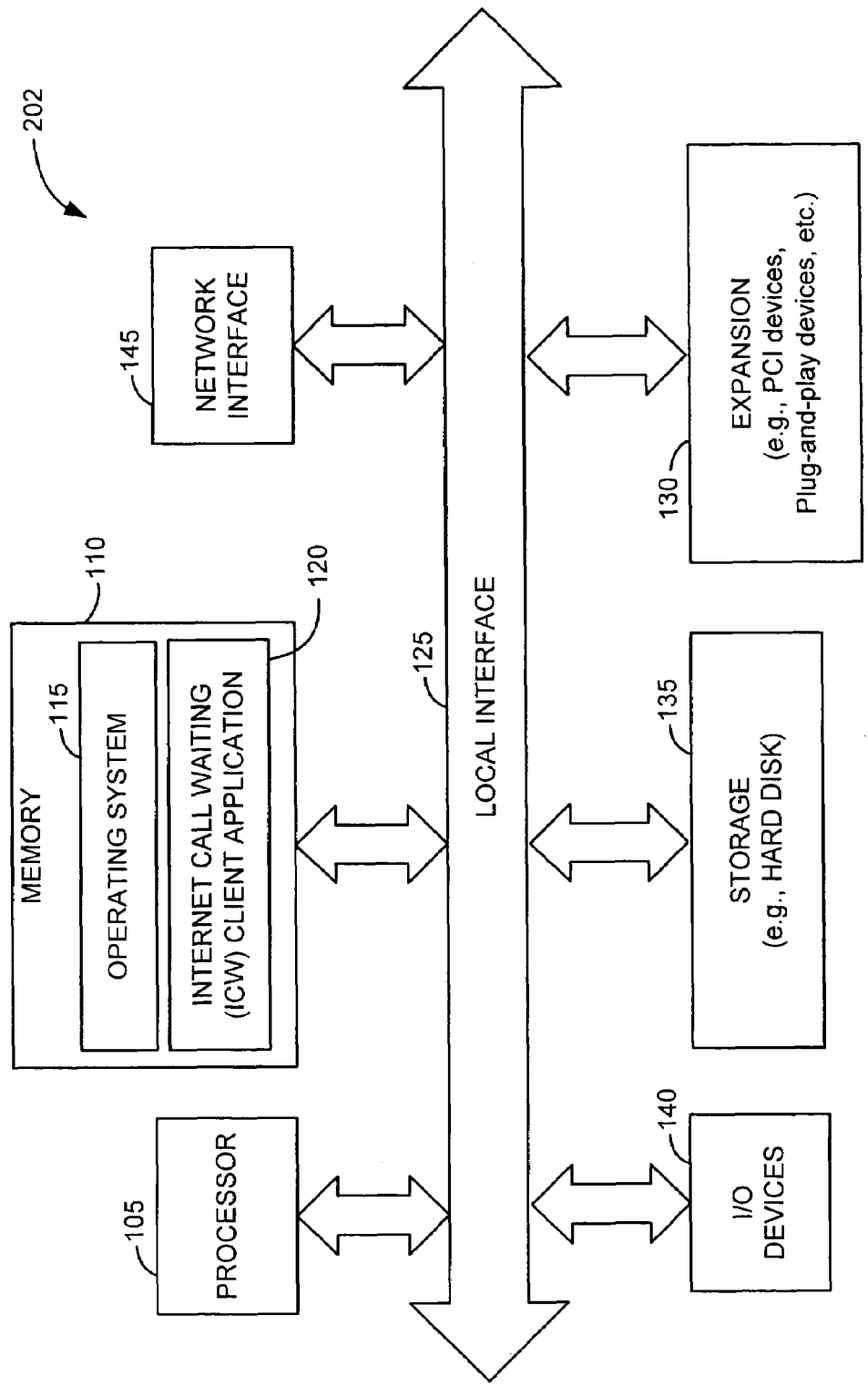
FIG. 1 is a block diagram showing component architecture for a computer that has a callee client, as shown in FIG. 2.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Unlike many known systems and methods associated with unified messaging, the approaches presented herein provide systems and methods for integrating different communication modalities without substantially modifying existing communication systems. In some embodiments, among others, the integration is accomplished through a messaging server that provides the interface between the various communication modalities. Thus, rather than modifying the operation of the different modalities and constructing a new integrated system, the messaging server converts communications from one communication modality to another, thereby providing a simpler approach to integrating different communication modalities. As non-limiting examples, the communication modalities may include public switched telephone network (PSTN) telephony, email, instant messaging (IM), Internet call waiting (ICW), satellite telephony, cellular telephony, legacy voicemail, and many more.

Thus, in some embodiments, among others, legacy voicemail systems can be integrated with Internet-based communication systems without significant modification to either the legacy voicemail systems or the Internet-based communication systems. For those embodiments, the messaging server is configured to receive Internet-based communications and convert the Internet-based communications into legacy-voicemail-compatible communications. Similarly, the messaging server, for those embodiments, is configured to convert legacy voicemail messages and commands into Internet-compatible signals.

In other embodiments, among others, Internet call waiting (ICW) systems can be integrated with legacy voicemail systems. The integration between legacy voicemail and ICW permits the ICW systems to deposit voicemail messages into the legacy voicemail systems and, also, to extract messages from the legacy voicemail systems.

In yet other embodiments, among others, the ICW systems can be configured to include digital voicemail stores that store voicemail messages that are portable over the Internet. The integration of the legacy voicemail systems with the digital voicemail stores permits synchronous storage and extraction of voicemail messages from both the legacy voicemail systems and Internet-based systems. Thus, a user can avoid the inconvenience of checking for the same message at multiple platforms.

While specific communication modalities are used to illustrate the systems and methods in the several embodiments described below, it should be appreciated that the specific embodiments are provided for illustrative purposes, and are not intended to be limiting. For example, while legacy voicemail systems and ICW systems are shown in great detail with reference to FIGS. 1 through 31, it should be appreciated that the legacy voicemail system is an example of one communication system that is configured to communicate using a specified protocol. Since legacy voicemail systems have existed since 1979, and are known to those having skill in the art as evidenced by U.S. Pat. No. 4,371,752, the original voicemail patent issued to Matthews et al., only cursory descriptions of voicemail are provided when relevant.

Since protocols for accessing voicemail messages from legacy voicemail systems are relatively well-established, it should be appreciated that the protocol associated with legacy voicemail is an example of a standard communication protocol. Likewise, it should be appreciated that the ICW system is an example of another communication system that is configured to communicate using a different specified protocol. In that regard, the established protocol associated with ICW is an example of another standard communication protocol. Specifically, with reference to ICW, the protocol may include both Internet-based protocols and PSTN-telephony-based protocols, since ICW has both an Internet component and a PSTN component.

FIG. 1 is a block diagram showing component architecture for a computer, which can be one embodiment, among others, of a callee client 202 that interfaces a user (not shown) to multiple communication modalities. As shown in FIG. 1, the callee client 202 includes a processor 105 and memory 110, which are both electrically coupled to a local interface (or bus) 125. The callee client 202 of FIG. 1 also includes a network interface 145 coupled to the bus 125. The network interface 145 permits the callee client 202 to communicate across a network (not shown in FIG. 1) with other network devices (not shown in FIG. 1) that may be communicatively coupled to the network.

In some embodiments, the callee client 202 can also include input/output (I/O) devices 140 such as a keyboard, mouse, monitor, or other known I/O devices. Additionally, the callee client 202 can include a local storage device 135 such as, for example, a hard disk. Moreover, the callee client 202 can also include expansion slots 130 to accommodate, for example, plug-and-play devices or peripheral component interconnect (PCI) devices. Since I/O devices 140, local storage devices 135, and expansion slots 130 are known to those having skill in the art, further discussion of these components is omitted here. Additionally, since the interaction among these components within a computer are known to those of skill in the art, further discussion of the internal computer architecture is omitted here.

In one embodiment, among others, the memory 110 includes the operating system 115 and an Internet call waiting (ICW) client application 120. The ICW client application 120 enables the callee client 202 to handle incoming telephone calls to a particular public switched telephone network (PSTN) line when a modem a user is accessing a dial-up Internet service over the same PSTN line. Conventional ICW applications are known to those having skill in the art, as evidenced by U.S. Pat. No. 5,805,587, having the title "Call Notification Feature for a Telephone Line Connected to the Internet" by Norris el al., which is incorporated herein by reference in its entirety. Hence further discussion of conventional ICW applications is omitted here.

The ICW client application 120 of FIG. 1, however, unlike conventional ICW applications, provides a setup "wizard" that streamlines the setup process with minimal user input. An example embodiment, among others, of the setup wizard are shown with reference to FIGS. 3 through 15 below.

Once a user has set up the ICW application 120 and logged in at the callee client 202 using a dial-up connection over a PSTN telephone line, the ICW application 120 provides various alerts and/or notifications to the user, thereby apprising the user of incoming telephone calls over the same PSTN telephone line. As described below with reference to FIGS. 16 through 31, the user can provide one or more responses to the alerts and/or notifications, which, in turn, results in a different handling of the incoming telephone call. Unlike standard systems, however, the handling of the calls, in some embodiments, involves multiple communication modalities with different communication protocols. Specifically, multiple communication modalities are accessed without substantially altering the communication protocols for those communication modalities. In a preferred embodiment, among others, the communication protocols and communication systems are left undisturbed, thereby preserving the stability of the underlying communication systems and the robustness of the communication protocols. Rather than altering known systems and protocols, an additional translator interfaces the undisturbed communication systems and translates between the known protocols.

As described below, in some embodiments, the translator is implemented as a messaging server that is communicatively coupled to the various communication systems. The messaging server is configured to receive data and/or commands using one protocol for one communication system and convert the data/commands into another protocol for another communication system. By having such a messaging server, multiple communication modalities can be integrated in a modular fashion. Thus, in the future, if additional communication modalities are developed, those communication modalities can be seamlessly integrated with the existing communication modalities by reconfiguring the messaging server to accommodate the new communication modality. In other words, rather than reconstructing an entire communication system, as in some unified messaging systems, the different communication modalities can be integrated by modifying the messaging server. An embodiment of a system having a messaging server is shown with reference to FIG. 2, while embodiments of the operation of the messaging server are shown with reference to FIGS. 16 through 31.

Figure 2:
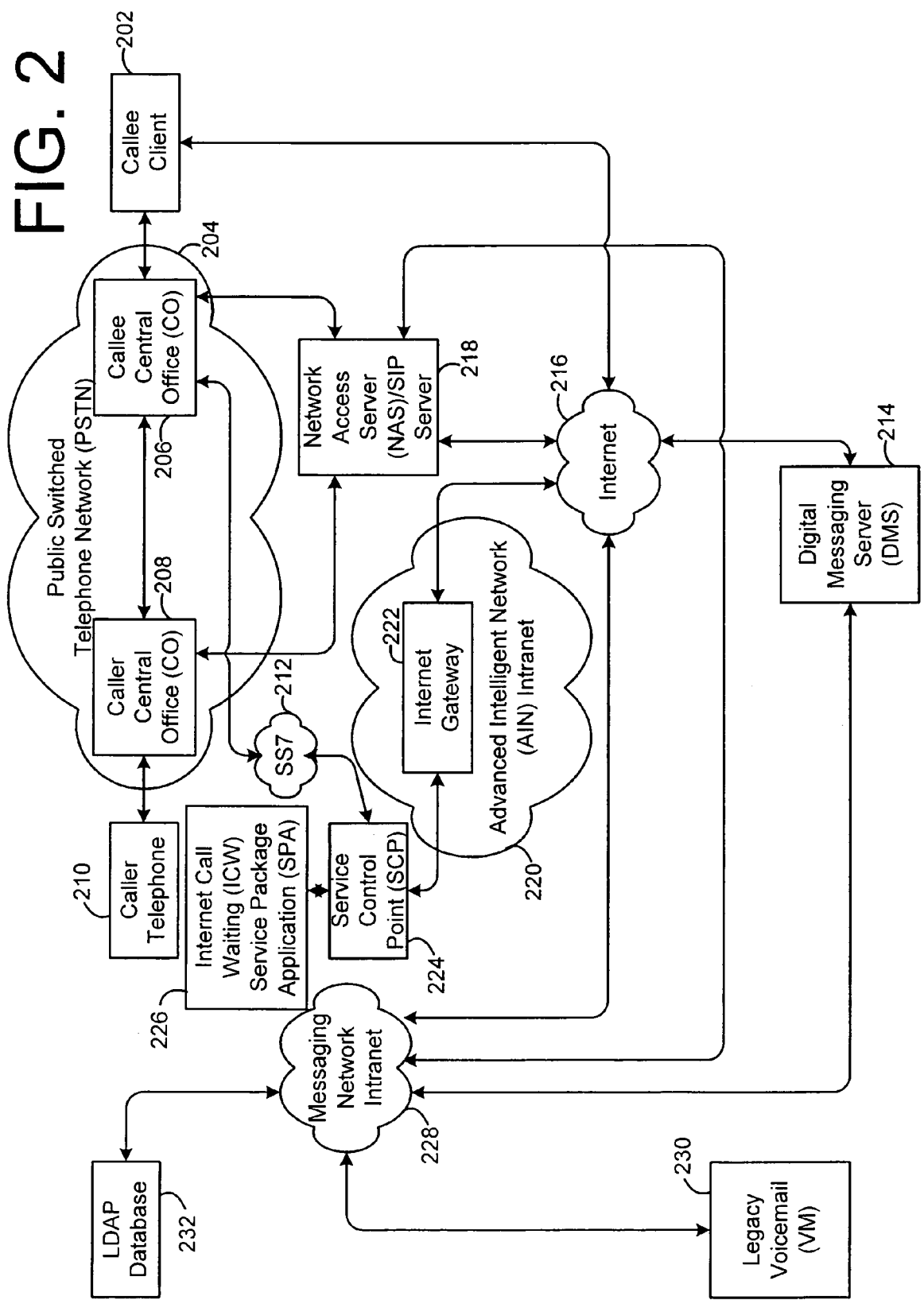
FIG. 2 is a block diagram showing various system components associated with multiple communication modalities.

FIG. 2 is a block diagram showing various system components associated with multiple communication modalities.

As shown in FIG. 2, one embodiment, among others, includes a public switched telephone network (PSTN) 204, an advanced intelligent network (AIN) intranet 220, a messaging network intranet 228, and the Internet 216, which are networks that are familiar to those having skill in the art. As known in the art, the AIN intranet 220 can include an Internet gateway 222, which facilitates communications between the AIN intranet 220 and various Internet-compatible components. The Internet gateway 222 is also communicatively coupled to the SCP 224, thereby effectively providing a communication pathway between the SCP 224 and various Internet-based communication systems.

As further known to those having skill in the art, the PSTN 204 can include a caller central office (CO) 208 and a callee CO 206, which are communicatively coupled to a caller telephone 210 and the callee client 202, respectively. The callee CO 206 and the caller CO 208 are communicatively coupled to each other, thereby providing a communication connection between a caller at the caller telephone 210 and a callee at the callee client 202. Since the operating protocols of the PSTN 204 are known in the art, only a truncated discussion of the PSTN 204 components is provided when appropriate.

In addition to these (and possibly other) networks, the embodiment of FIG. 2 includes various components such as, for example, a lightweight directory access protocol (LDAP) database 232 and a legacy voicemail repository 230 (also referred to as a legacy voicemail mailbox), which are both communicatively coupled to the messaging network intranet 228. The legacy voicemail repository 230, in some embodiments, is a component part of an entire legacy voicemail system. Since LDAP databases 232 and legacy voicemail systems are known in the art, only a truncated discussion of these components is provided when appropriate.

The callee CO 206 and the caller CO 208 are communicatively coupled to an SS7 network 212, which uses a signaling system 7 (SS7) telephony protocol, as known in the art. The SS7 network 212 is communicatively coupled to a service control point (SCP) 224. Since the SS7 telephony protocol and the operation of the SCP 224 are known in the art, only a truncated discussion of SS7 network 212 and the SCP 224 is provided when appropriate.

So far, with the exception of the callee client 202, the components discussed above with reference to FIG. 2 are standard network components. In various embodiments, the standard components are substantially unmodified. In this regard, throughout this disclosure, the term "standard" implies that the system, protocol, modality, or other component operates in accordance with known standards and protocols, with little or no modification. Since these standard systems, protocols, modalities, and/or other components and their respective operations are known to those having skill in the art, only cursory descriptions of the standard systems, protocols, modalities, and/or components are provided when relevant. Also, it is intended that "standard" encompass any future technologies that may be adopted as a standard or convention.

In a preferred embodiment, among others, the standard components are wholly unaltered, thereby maintaining the inherent stability and robustness of these components. Thus, for some embodiments, the caller CO 208, the callee CO 206, SS7 network 212, the SCP 224, the caller telephone 210, the AIN intranet 220, the messaging network intranet 228, the Internet gateway 222, the PSTN 204, the legacy voicemail repository 230, and the LDAP database 232 operate without any modifications to their communication protocols.

In addition to the standard components, some embodiments, among others, include an internet Internet call waiting (ICW) service package application (SPA) 226, which is a corresponding server component to the ICW client application 120 of FIG. 1. The ICW SPA 226 is communicatively coupled to the SCP 224. The ICW SPA 226 is configured to receive various requests from the ICW client application 120. For example, when the callee client 202 receives an incoming telephone call while a user is logged onto a dial-up Internet connection, the ICW client application 120 prompts the user to dispose of the incoming telephone call by providing one or more selections to the user. In response to the user's input, the ICW client application 120 issues one or more requests to the ICW SPA 226. The ICW SPA 226 then issues instructions (or commands) to the SCP 224, which correspond to the request by the ICW client application 120. The SCP 224, in response to the instructions from the ICW SPA 226, conveys the instructions to the callee CO 206 so that the callee CO may dispose of the telephone call in an appropriate manner. Various embodiments of the call disposition are shown with reference to FIGS. 16 through 31.

The call dispositions are also handled by a network access server (NAS) 218 in conjunction with the callee CO 206. In some embodiments, the NAS 218 also provides session initiation protocol (SIP) server 218 capabilities. Thus, FIG. 2 shows a single NAS/SIP server 218, rather than separating the two conceptually distinct server functions. However, for convenience, the NAS/SIP server 218 is referred to herein simply as the NAS 218.

The NAS 218 includes an analog communications port that is coupled to both the caller CO 208 and the callee CO 206. In some embodiments, the analog communications port is configured as a voice port for transmitting and receiving analog voice signals. The analog communications port permits the NAS 218 to receive analog voice signals from, and transmit analog voice signals to, the caller CO 208 and the callee CO 206. The NAS 218 is also communicatively coupled to the DMS 214 through the Internet 216, thereby permitting communication between the caller CO 208 and the DMS 214 through NAS 218 and the Internet 216. In addition to the analog voice communications port, the NAS 218 also includes a digital voice communications port. The digital voice communications port is coupled to the Internet 216, thereby permitting digital communications between the NAS 218 and other components that may be connected to the Internet 216. Since the NAS 218 is amenable to both digital and analog communications, the NAS 218 includes both digital-to-analog (D/A) conversion capabilities as well as analog-to-digital (A/D) conversion capabilities. Since various D/A and A/D conversion approaches are known in the art, further discussion of D/A and A/D is omitted here.

In addition to the ICW SPA 226 and the NAS 218, the embodiment of FIG. 2 further includes a digital messaging server (DMS)/SIP server 214. For convenience, the DMS/SIP server 214 is referred to herein simply as "DMS" 214. The DMS 214 is communicatively coupled to both the Internet 216 and the legacy voicemail repository 230 (also referred to simply as legacy VM). In one embodiment, among others, the DMS 214 is coupled to the legacy VM 230 through the messaging network intranet 228.

The DMS 214, in some embodiments, among others, is configured to generate a temporary digital mailbox, which provides a convenient holding space for digital messages as they are being conveyed from one communication system to another communication system. In a preferred embodiment, among others, the DMS 214 is configured to generate a temporary digital voicemail store that stores a digital voicemail message for further processing.

For those embodiments in which the DMS 214 generates a digital voicemail store, a mechanism exists for correlating a callee's telephone number and the callee's Internet address. Thus, when a user's Internet connection prematurely disconnects prior to conveying the digital voicemail message to the callee client 202, it is possible that a new Internet address is assigned to the callee when the callee reconnects to the Internet. Thus, it is possible that a particular digital voicemail message may be associated with a constantly-changing Internet address. As one can see, this becomes problematic when the digital voicemail message is to be delivered to a particular callee client 202 over the Internet 216, and the Internet address of the callee client 202 may vary over time.

In order to remedy this problem, when a digital voicemail message is stored in the temporary digital voicemail store, that digital voicemail message should be correlated to a stationary or non-varying reference. In a preferred embodiment, among others, that non-varying reference may be a user's 10-digit telephone number. Since the user's 10-digit telephone number will be constant regardless of the Internet address from which the user logs in, by correlating the digital voicemail message to the user's 10-digit telephone number, that digital voicemail message can be delivered to the user's callee client 202 regardless of how often the Internet address may change.

Thus, in operation, the DMS 214 receives a digital voicemail message that is directed to a particular recipient. Substantially synchronously, the DMS 214 creates a digital voicemail store to store the digital voicemail message. The 10-digit telephone number (or other non-varying information) is incorporated into the digital voicemail store to identify the digital voicemail store as belonging to the recipient.

Figure 26:
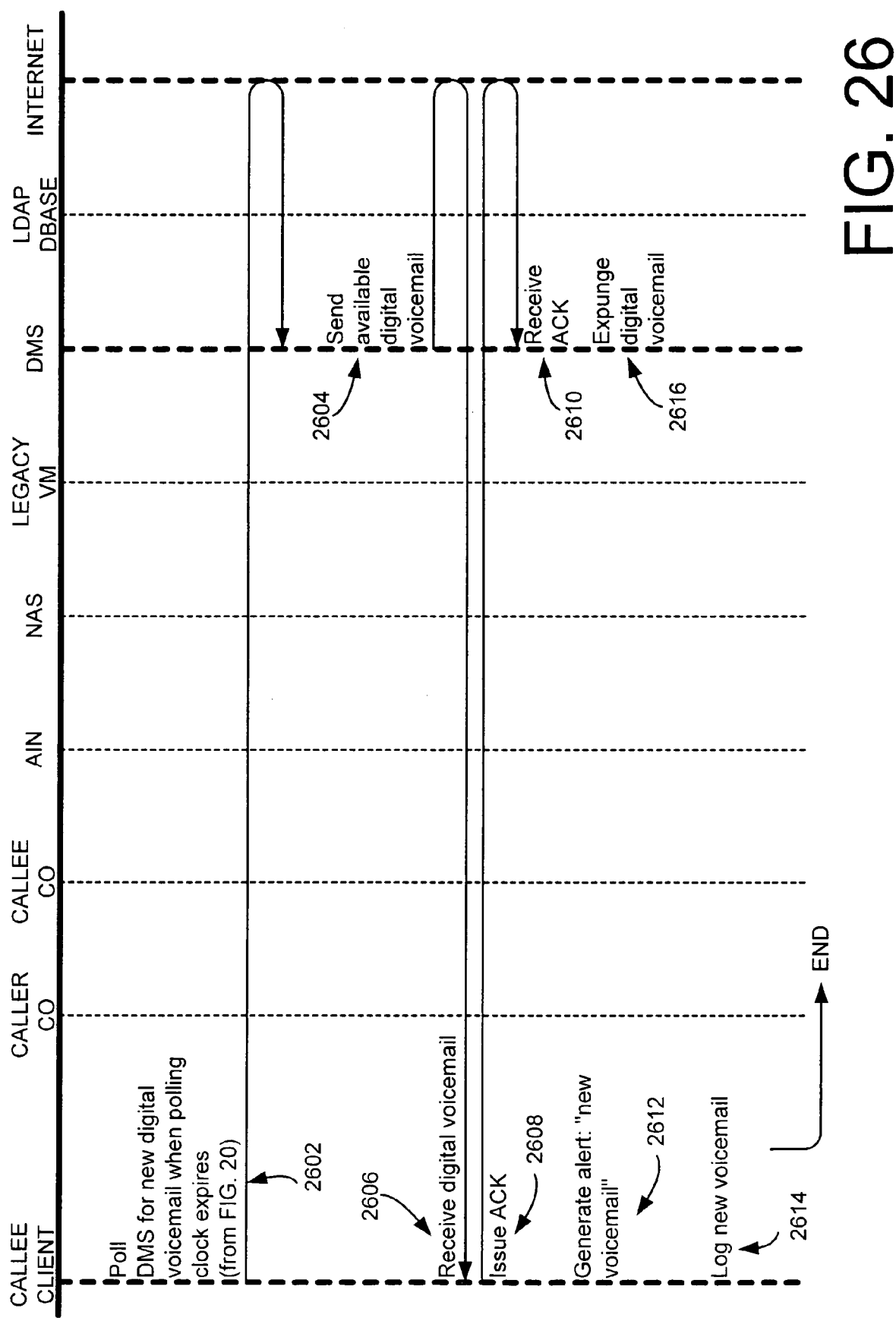
FIG. 26 is a data flow diagram showing an embodiment of a process continuing from FIG. 20.

Once the digital voicemail message has been downloaded to the callee client, as described, for example, in FIG. 26, the digital voicemail store may be destroyed or deleted in order to free up storage space on the DMS 214. In other words, the digital voicemail store, in some embodiments, appear and disappear as needed, thereby conserving storage space at the server. This type of appearing/disappearing temporary digital voicemail store provides a streamlined approach to conveying messages from one communication system to another communication system.

The DMS 214, in conjunction with the NAS 218, converts signals (e.g., messages, commands, etc.) from one communication protocol to another communication protocol. For example, the DMS 214 and the NAS 218 can be configured to convert analog signals, which originate from the PSTN 204, to digital signals, which are conveyed to various Internet-compatible systems. In one specific example, the NAS 218 may receive an analog voice signal from the caller CO 208 and digitize the analog voice signal. The digitized signal may then be conveyed to the DMS 214 with an indication that the digitized signal originated from the caller CO 208. The DMS 214 may receive the digitized signal from the NAS 218 and, upon receiving the signal and the appropriate indication of origin, convert the digitized signal into various Internet-compatible data, such as, for example, an attachment to an email message, an attachment to an instant messaging (IM) message, a digital voice stream using voice-over-Internet protocol (VoIP), or a variety of other Internet-compatible data streams. If the digitized signal is converted to VoIP data stream, then the VoIP data stream can subsequently be stored in a digital voicemail store and/or transmitted in near real-time over the Internet 216. If the digitized signal is attached to an email message, then the email message can subsequently be transmitted to an email recipient. Similarly, if the digitized signal can be transmitted over IM, in accordance with known IM protocols. FIGS. 16 through 31 show embodiments that employ Internet call waiting (ICW). Thus, FIGS. 16 through 31 shows an example of integration between PSTN-telephony-based protocols and known ICW protocols.

FIGS. 3 through 7 are flowcharts showing an embodiment of a process for setting up a user interface at the computer of FIG. 1, while FIGS. 8 through 15 are diagrams showing embodiments of user interfaces that can be presented to a user during the setup process of FIGS. 3 through 7. The user interface (not shown) provides an interface for accessing multiple communication modalities. In some embodiments, the multiple communication modalities can be accessed substantially synchronously. The embodiment of FIGS. 3 through 15 provide a streamlined approach to setting up the ICW client application 120 with very little user input. In other words, the setup process is mostly automated, thereby reducing potential user error.

Figure 3:
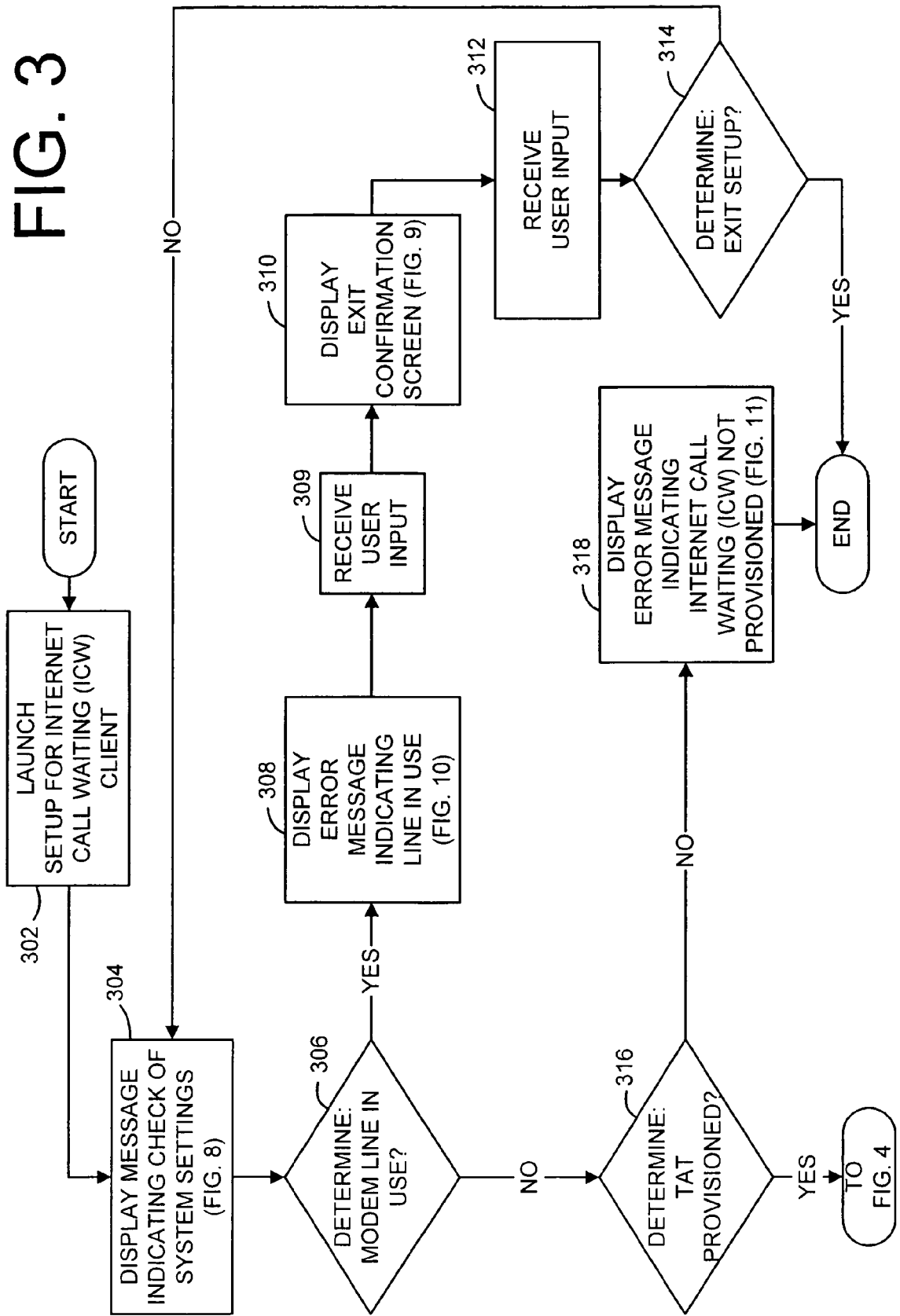
FIG. 3 is a flowchart showing initial steps of an embodiment in a process for setting up a user interface at the computer of FIG. 1.

As shown in FIG. 3, upon loading installation (or setup) software for ICW onto a user's computer (or the callee client 202), the ICW setup software is launched (302). Upon launching (302) the ICW setup software, a message is displayed (304) to the user to indicate that the system settings are being checked. The indication may appear similar to the display shown in FIG. 8.

Upon displaying (304) the message, the callee client 202 determines (306) whether or not the modem line attached to the callee client 202 is being used. If the callee client 202 determines (306) that the modem line (i.e., the PSTN telephone line connected to the modem) is being used, then the callee client 202 displays (308) an error message indicating that the modem line is in use. That error message 1002 may appear similar to that shown in FIG. 10, which requests the user to acknowledge the error message. The callee client 202 waits for a user input and, in response to receiving (309) the user input, displays (310) an exit confirmation screen 902 similar to that shown in FIG. 9. The exit confirmation screen 902 provides a selection 904 to exit and, also, a selection 906 to not exit. When the user provides a selection, the callee client 202 receives (312) the selection and determines (314) whether or not the user has chosen to exit the setup process. If the user has chosen to exit the setup process, then the setup process ends. If, however, the user has chosen not to exit the setup process (e.g., the modem line has been relinquished and the user wishes to continue the setup), then the callee client 202 again displays (304) the message indicating that system settings are being checked, and the process repeats itself.

If the callee client 202 determines (306) that the modem line is not in use, then the callee client 202 further determines (316) whether or not a termination attempt trigger (TAT) for ICW is provisioned on the modem line. If the callee client 202 determines (316) that the TAT for ICW is not provisioned on the modem line, then the callee client 202 displays (318) an error message indicating that ICW is not provisioned on the modem line. In some embodiments, the error message 1102 may be similar to that shown in FIG. 11. Upon displaying (318) the error message, the process ends. If the callee client 202 determines (316) that the modem line is provisioned with the TAT for ICW, then the process continues to FIG. 4.

Figure 4:
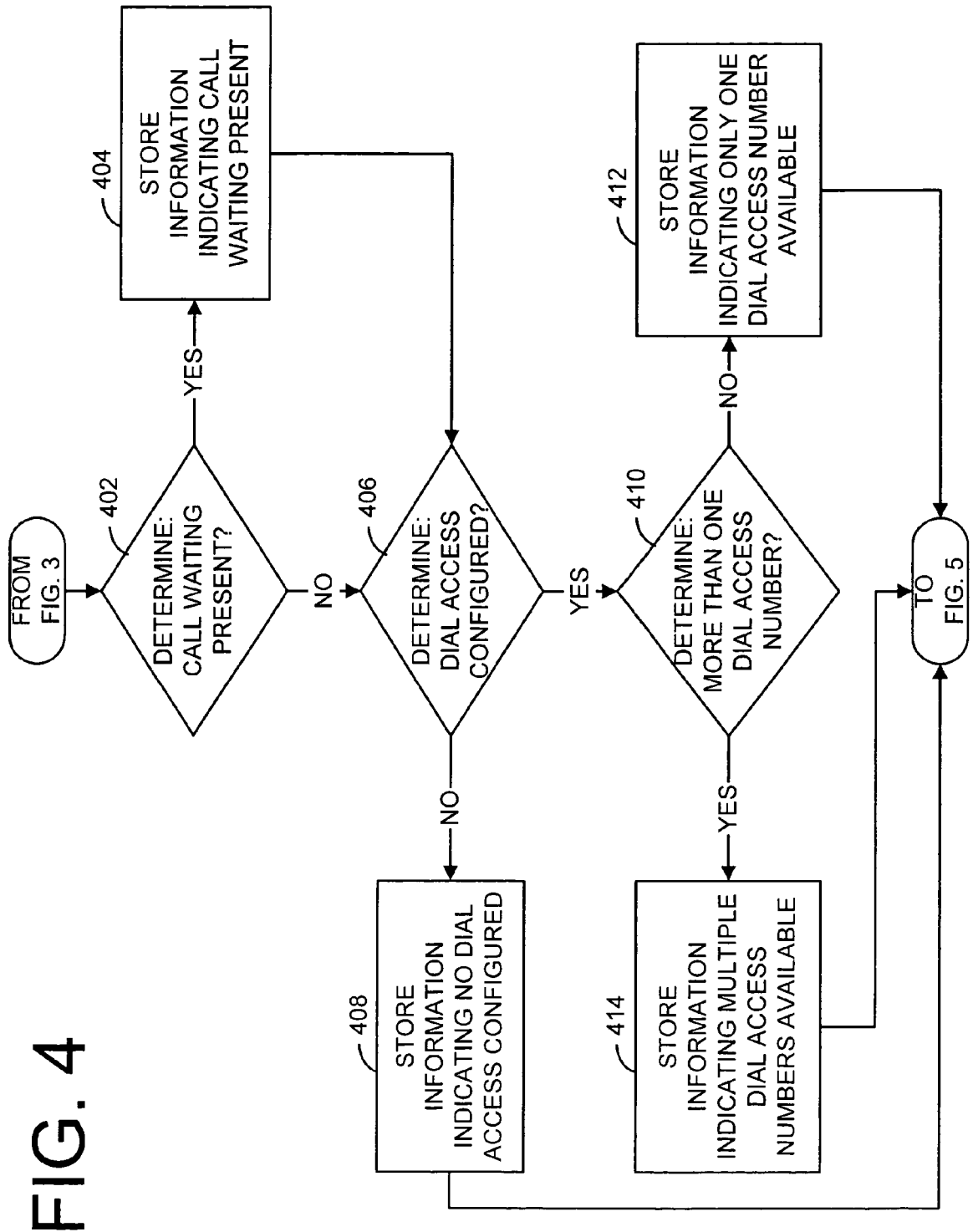
FIG. 4 is a flowchart showing an embodiment of a process continuing from FIG. 3.

As shown in FIG. 4, the callee client 202 further determines (402) whether or not call waiting is available on the modem line. If the callee client 202 determines (402) that call waiting is available on the modem line, then the callee client 202 stores (404) information, which reflects that call waiting is available on the modem line. This information is later used when setting up the dial string for dial-up access to various Internet service providers (ISPs).

If the callee client 202, however, determines (402) that call waiting is not available on the modem line, then the callee client 202 stores (404) information, which reflects that call waiting is not available on the modem line. This information is later used when setting up the dial string for dial-up access to various Internet service providers (ISPs). Then the callee client 202 further determines (406) whether or not dial access is configured on the modem line. In other words, the callee client 202 determines (406) whether or not the user has provided dial-up information for one or more ISPs. This is done, in some embodiments, by accessing registry information on the callee client 202, which is indicative of the various system settings for the callee client 202. Upon accessing the registry settings, if the callee client 202 determines (406) that no dial-up information has been provided, then the callee client 202 stores (408) information indicating that no dial access is configured. This information is subsequently used to provide an interface for the user to input dial-up information and for updating the registry.

If the callee client 202 determines (406) that dial access is configured, then the callee client 202 further determines (410) whether more than one dial access number is available. More than one dial access number may be available if the user is a subscriber to more than one ISP. If the callee client 202 determines (410) that more than one dial access number is available, then that information is stored (414). Conversely, if the callee client 202 determines (410) that only one dial access number is available, then that information is stored (412). Upon storing (412 or 414) the appropriate information, the process continues to FIG. 5.

Figure 5:
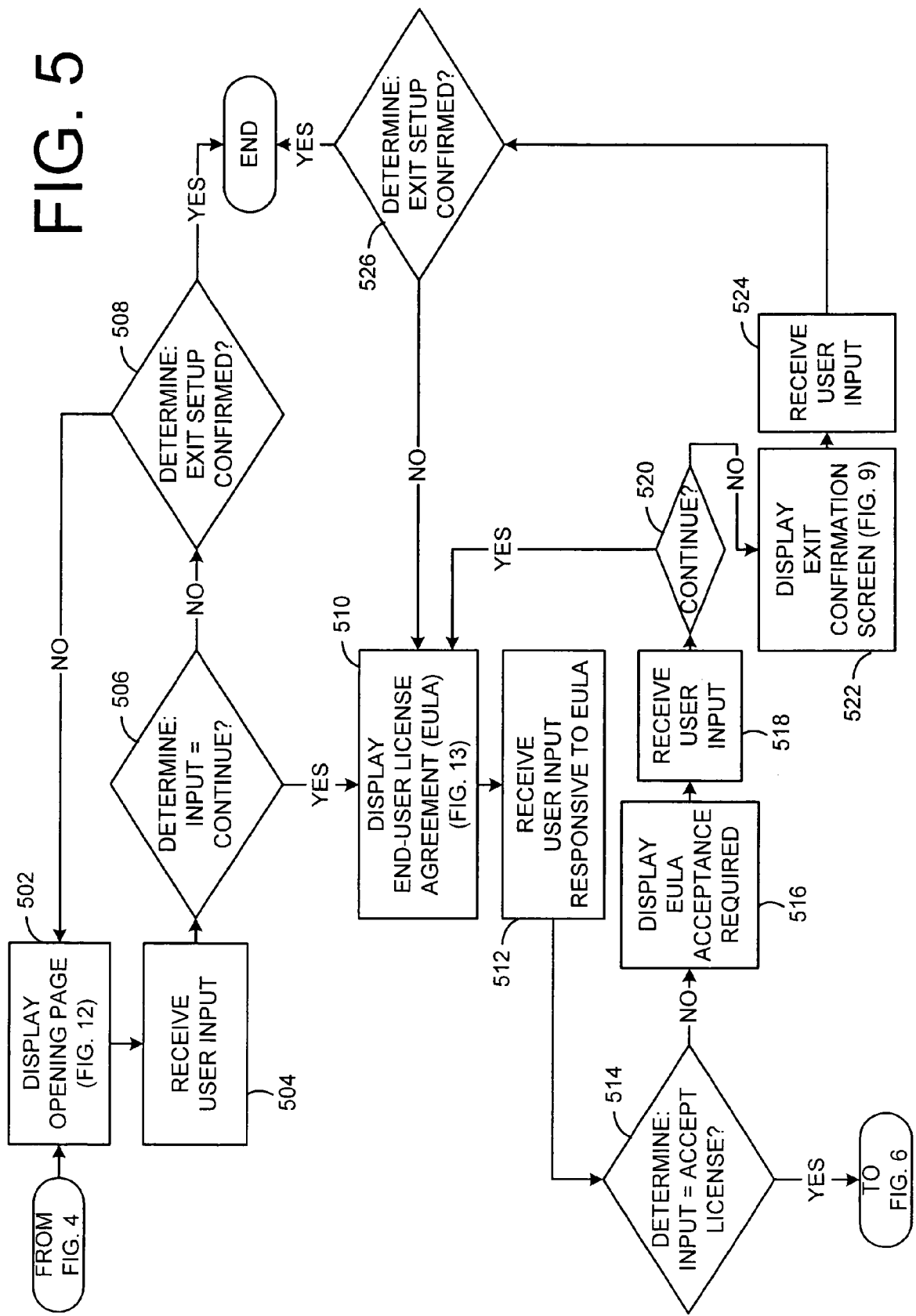
FIG. 5 is a flowchart showing an embodiment of a process continuing from FIG. 4.
Figure 12:
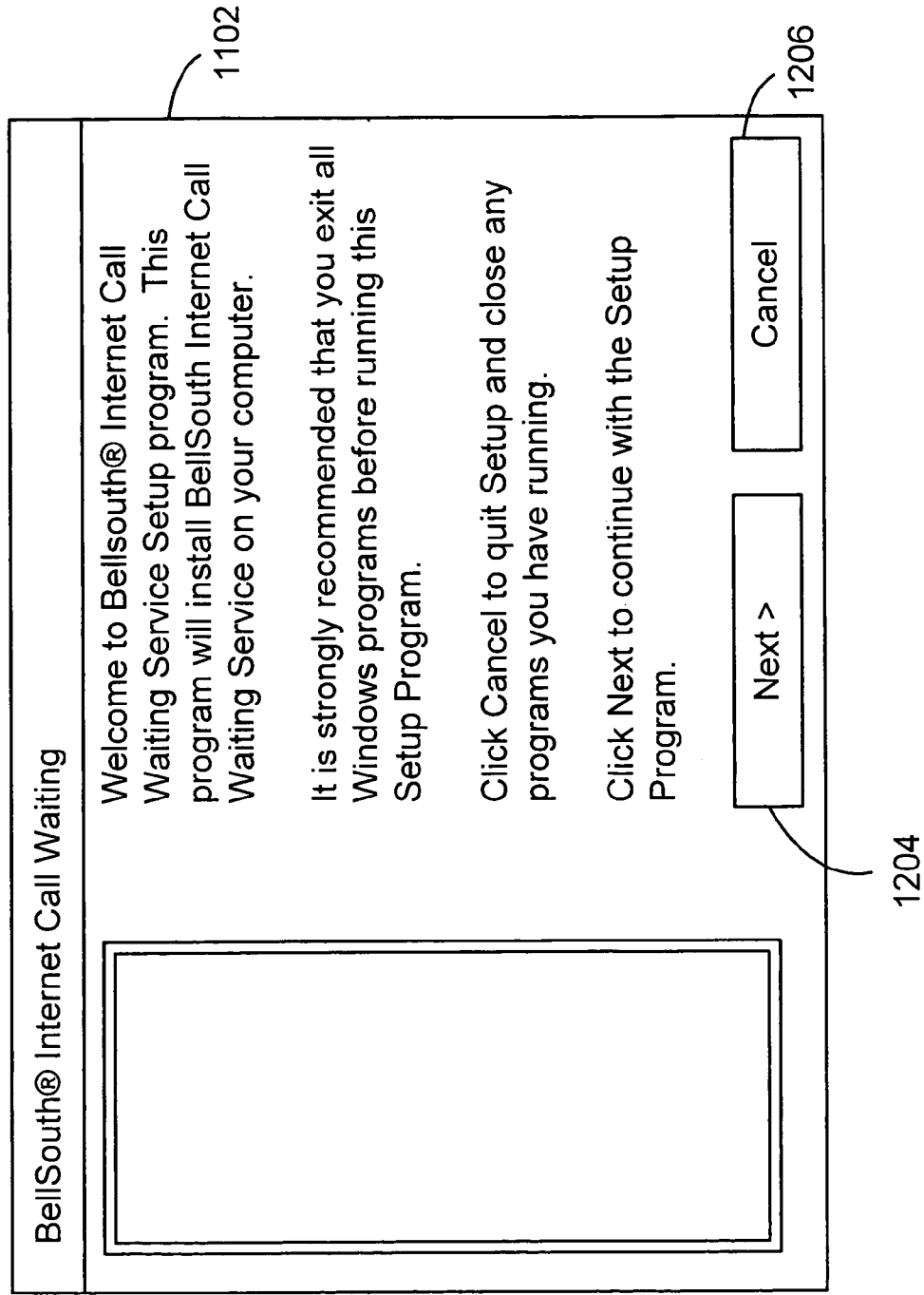
FIG. 12 is a diagram showing an embodiment of another user interface that can be presented to a user during the setup process of FIGS. 3 through 7.

As shown in FIG. 5, an opening page 1202, similar to that shown in FIG. 12, is displayed (502) to the user at the callee client 202. In some embodiments, the opening page 1202 includes an option 1206 to cancel the setup process and, also, an option 1204 to continue the setup process. When the user selects one of the options, the callee client 202 receives (504) the user input and determines (506) whether or not the setup process should continue. If the callee client 202 determines (506) that the setup process should not continue, then the callee client 202 prompts the user to confirm the cancellation and determines (508) whether or not to exit the setup process. The prompt may be provided at a user interface 902 similar to that shown in FIG. 9. If the termination of the setup process has been confirmed, then the setup process ends. However, if the termination of the setup process has not been confirmed, then the callee client 202 displays (502) the opening page 1202, and the process repeats from the displaying (502) of the opening page.

Figure 13:
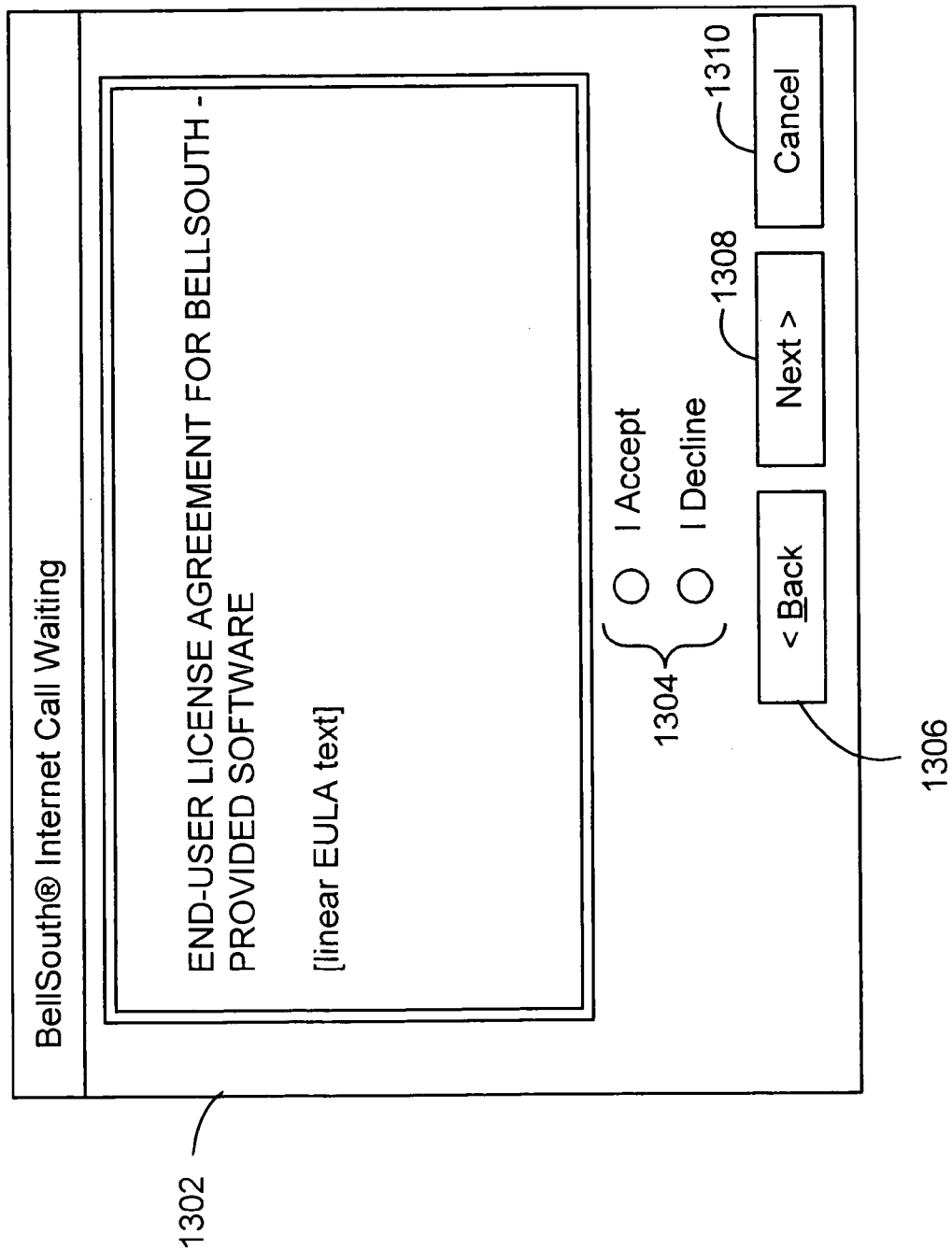
FIG. 13 is a diagram showing an embodiment of another user interface that can be presented to a user during the setup process of FIGS. 3 through 7.

If the callee client 202 determines (506) that the setup process should continue, then an end-user license agreement (EULA) 1302, similar to that shown in FIG. 13, is displayed (510) to the user. The EULA 1302 provides a selection 1304 to either accept the terms of the EULA 1302 or decline the terms of the EULA 1302. When the user provides a selection, the callee client 202 receives (512) the selection and determines (514), from the selection, whether or not the user has accepted the terms of the EULA 1302.

If the user has not accepted the terms of the EULA 1302, then a notice is displayed (516) to the user, which indicates that the user must accept the terms of the EULA 1302 in order to install the product. Thereafter, the callee client 202 receives (518) input, which indicates whether or not the user wishes to continue the setup process. In response to the user input, the callee client 202 determines (520) whether or not the process should continue. If the callee client 202 determines that the process should continue, then the EULA 1302 is, again, displayed (510) to the user, and the process continues from the displaying (510) of the EULA 1302. If the callee client 202 determines (520) that the user has chosen to exit the setup, then the callee client 202 displays (522) the exit confirmation screen 902 and, again, receives (524) a user's selection. Thereafter, the callee client 202 determines (526) whether or not the user has confirmed the termination of the setup process. If the user has confirmed the termination of the setup process, then the setup process ends. If, however, the user has not confirmed the termination of the setup process, then the EULA 1302 is, again, displayed (510) to the user, and the process continues from the displaying (510) of the EULA 1302.

Figure 6:
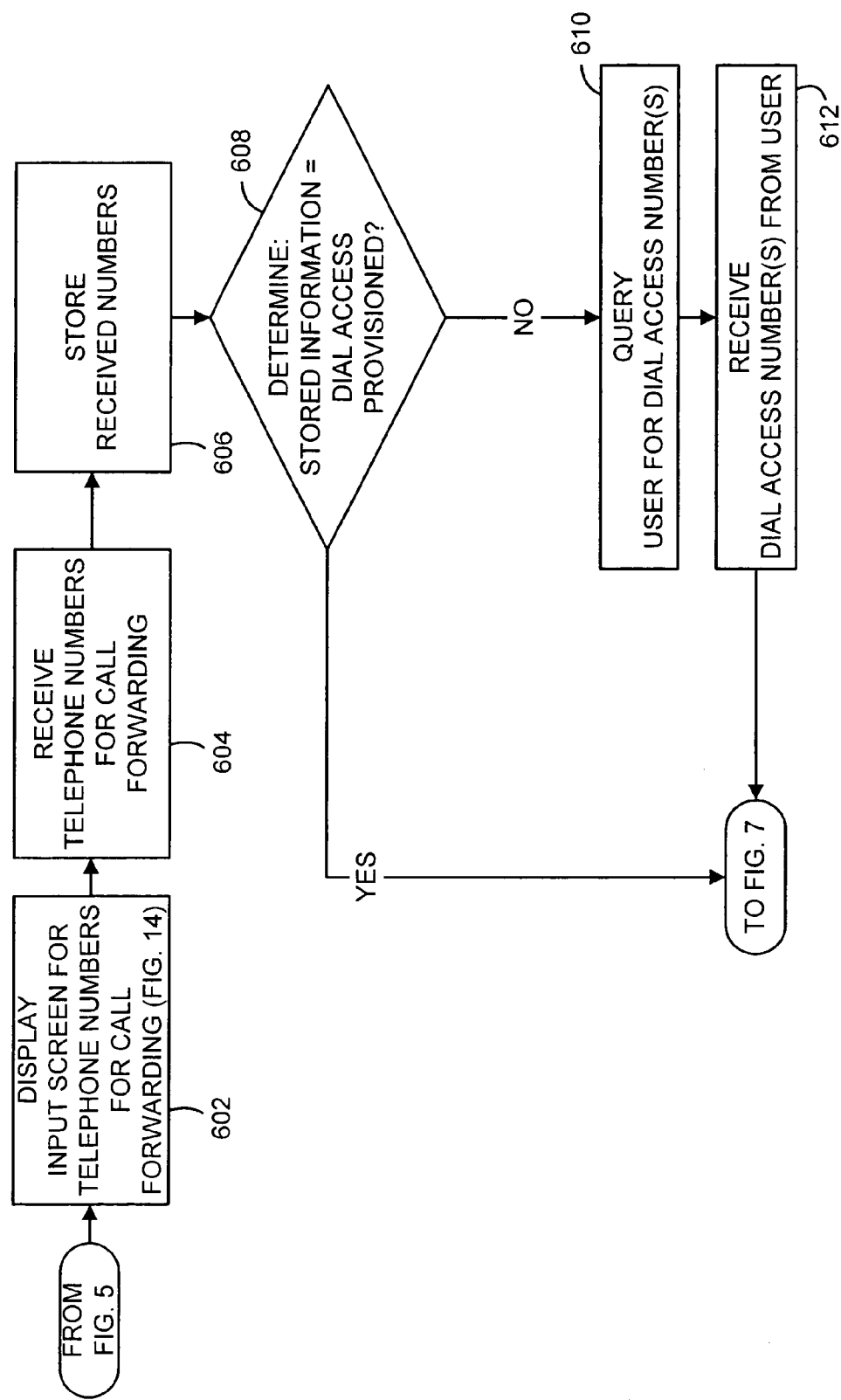
FIG. 6 is a flowchart showing an embodiment of a process continuing from FIG. 5.

When the EULA 1302 has been displayed (510) to the user, and callee client 202 determines (514) that the user has accepted the terms of the EULA 1302, then the process continues to FIG. 6. As shown in FIG. 6, the callee client 202 displays (602) an input screen 1402 for call-forwarding telephone numbers, similar to that shown in FIG. 14. As shown in FIG. 14, the input screen 1402 includes input areas 1404*a* . . . 1404*e* for names and, also, corresponding input areas 1406*a* . . . 1406*e* for telephone numbers that correspond to the names.

When the user provides those numbers, the callee client 202 receives (604) the call-forwarding telephone numbers and stores (606) the numbers. Thereafter, the callee client 202 determines (608) whether or not the stored information from FIG. 4 reflects that dial access has been provisioned. If the stored information reflects that no dial access numbers are available, then the callee client 202 queries (610) the user for one or more dial access numbers. When the user provides the dial access number(s), the callee client 202 receives (612) those numbers, and the process continues to FIG. 7. If the stored information reflects that one or more dial access numbers are available, then the process continues directly to FIG. 7.

Figure 7:
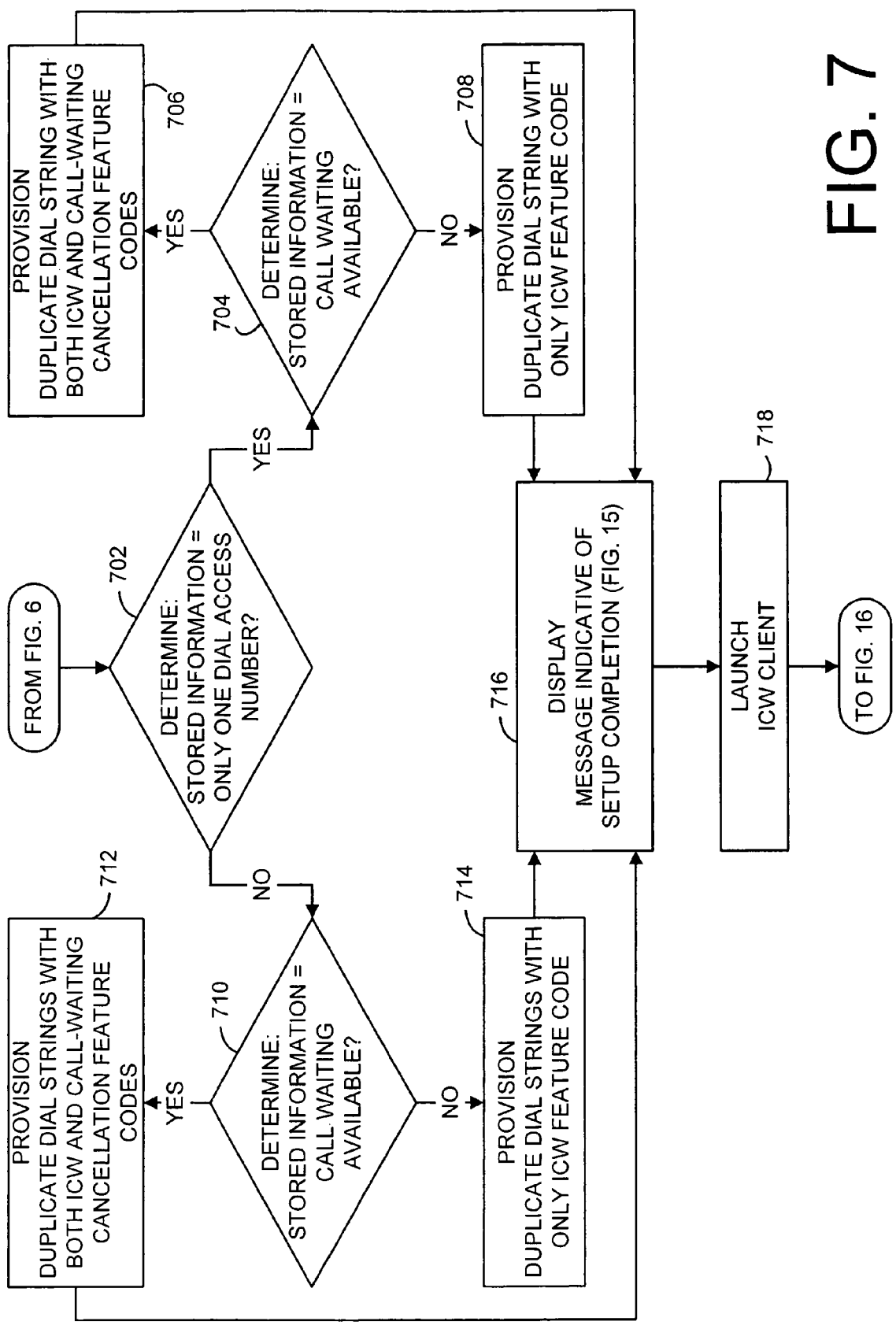
FIG. 7 is a flowchart showing an embodiment of a process continuing from FIG. 6.
Figure 8:
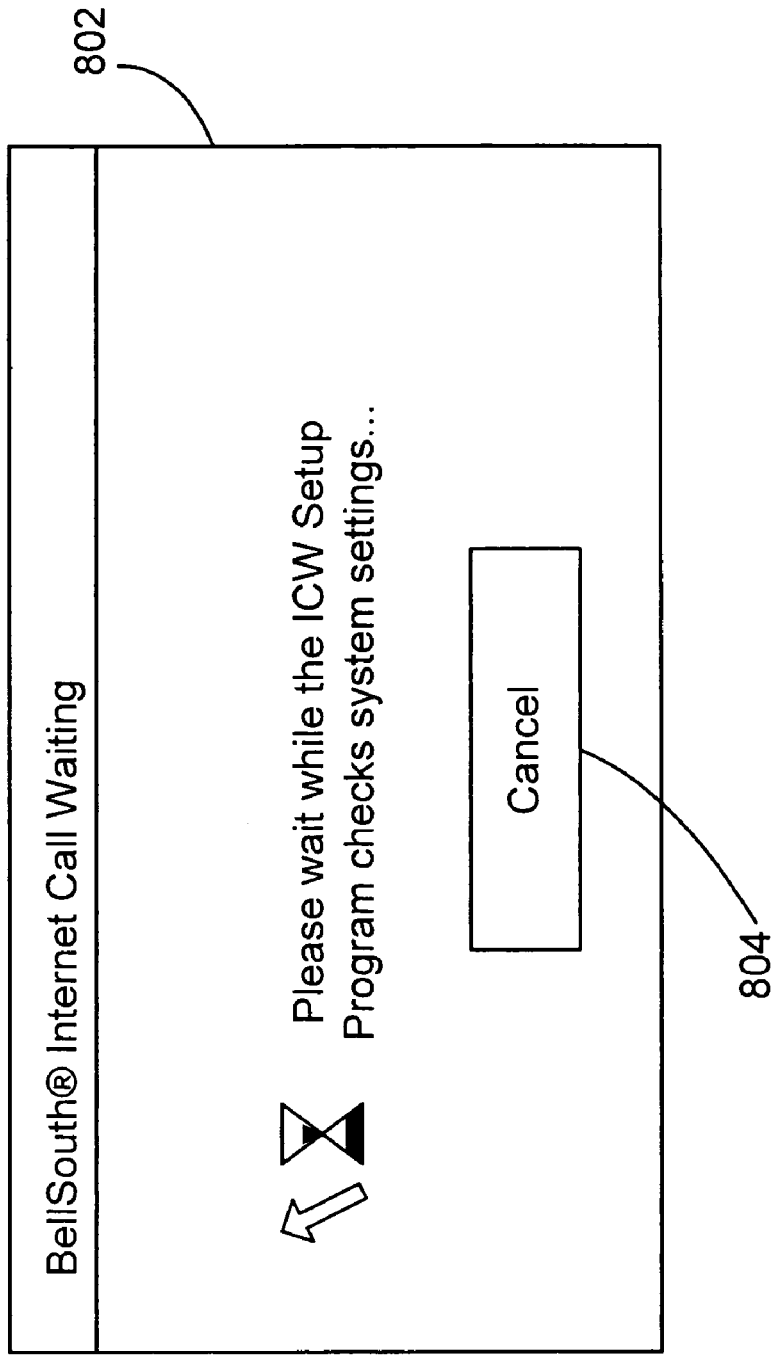
FIG. 8 is a diagram showing an embodiment of a user interface that can be presented to a user during the setup process of FIGS. 3 through 7.
Figure 9:
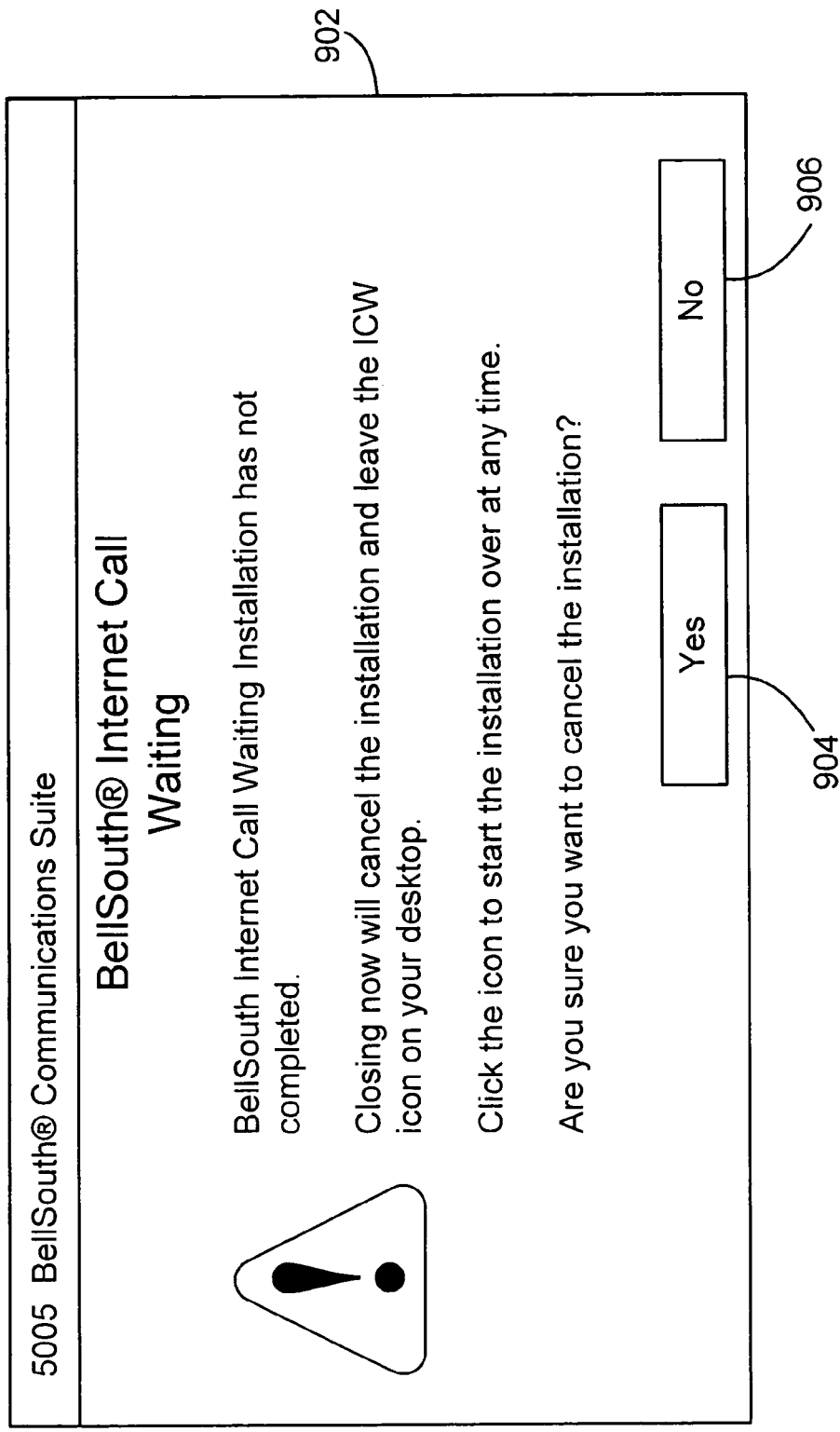
FIG. 9 is a diagram showing an embodiment of another user interface that can be presented to a user during the setup process of FIGS. 3 through 7.
Figure 10:
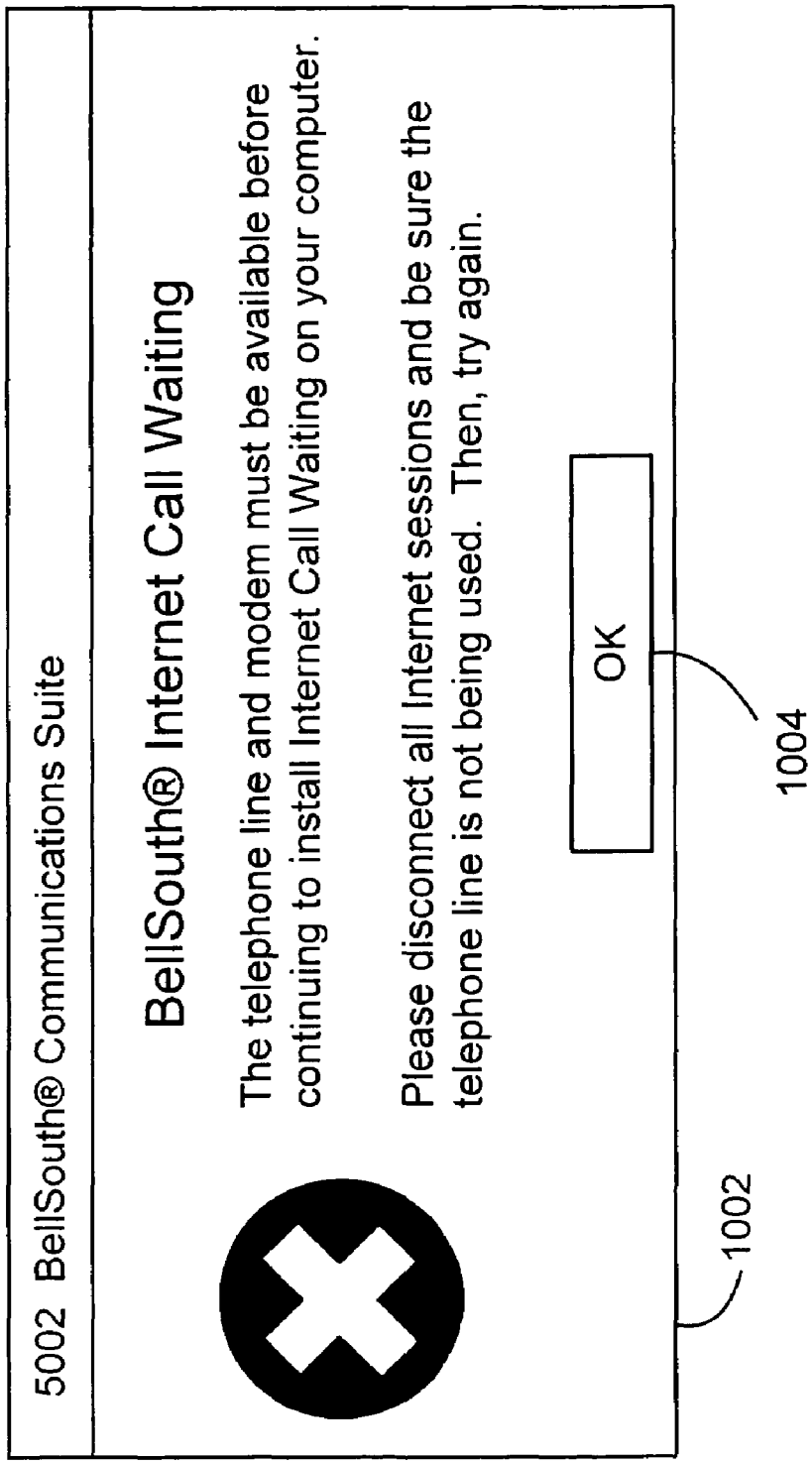
FIG. 10 is a diagram showing an embodiment of another user interface that can be presented to a user during the setup process of FIGS. 3 through 7.
Figure 11:
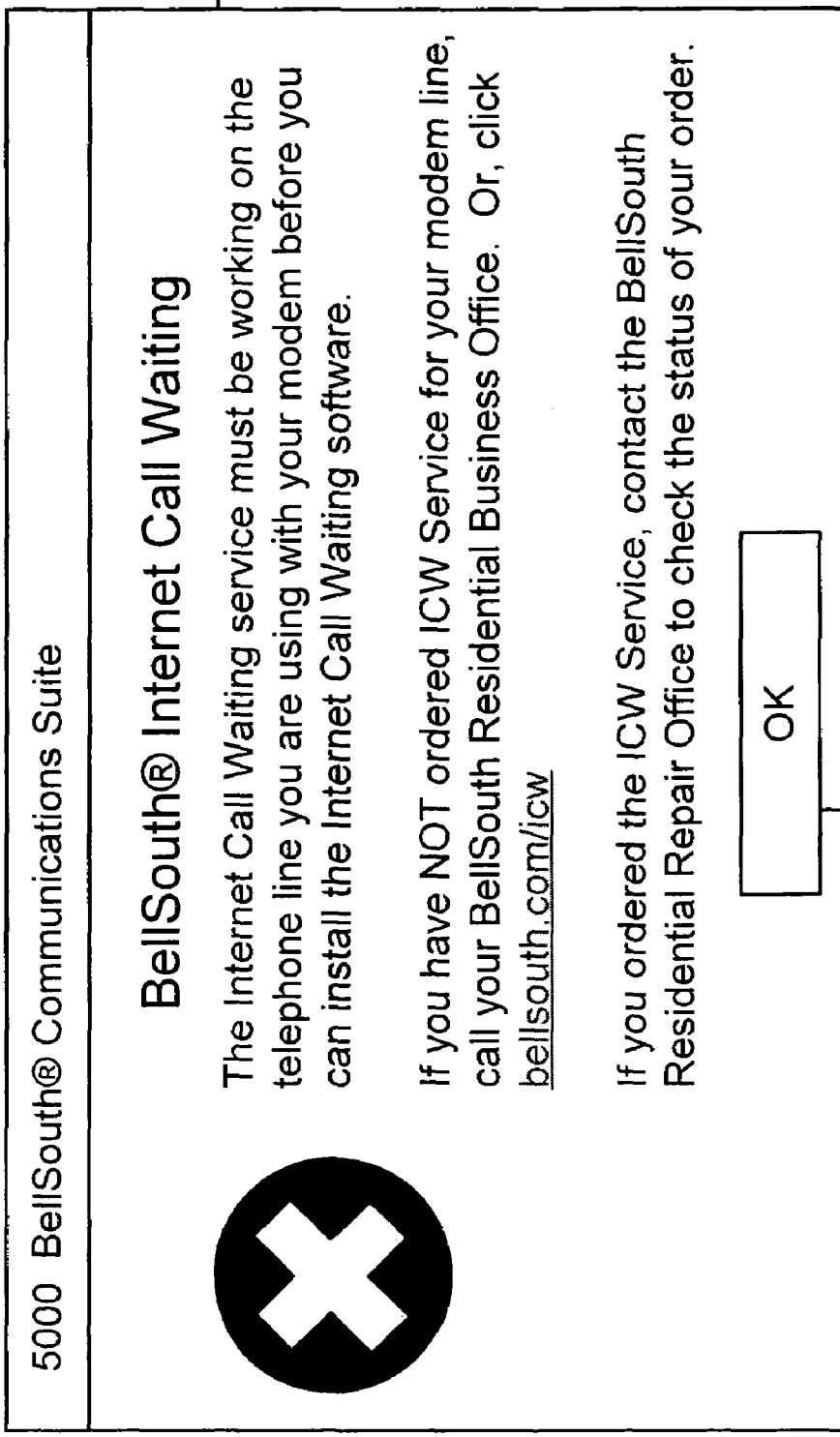
FIG. 11 is a diagram showing an embodiment of another user interface that can be presented to a user during the setup process of FIGS. 3 through 7.
Figure 15:
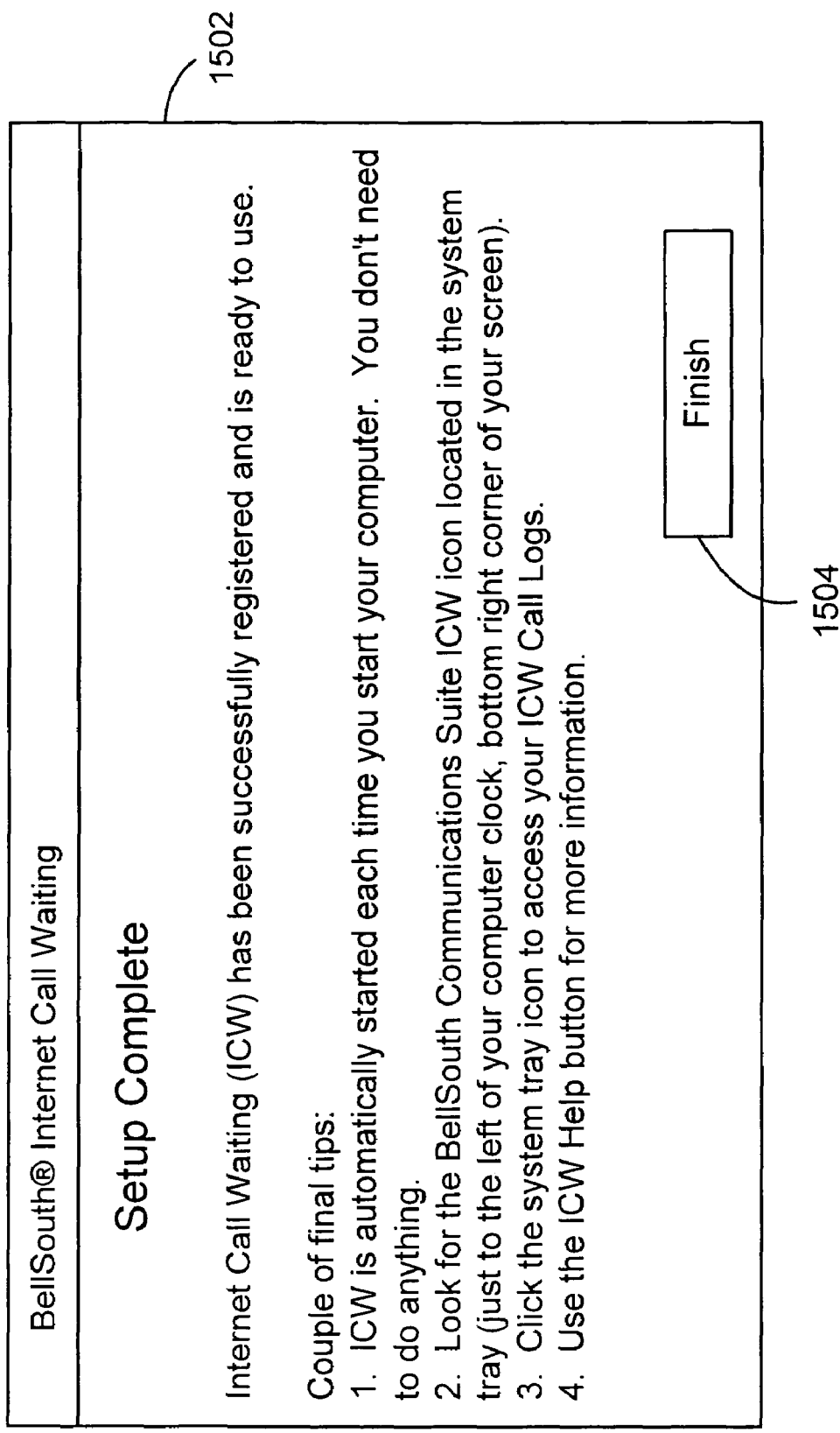
FIG. 15 is a diagram showing an embodiment of another user interface that can be presented to a user during the setup process of FIGS. 3 through 7.

As shown in FIG. 7, the callee client 202 determines (702) whether or not the stored in formation from FIG. 4 reflects that only one dial access number is available. If the information reflects that only one dial access number is available, then the callee client further determines (704) whether the stored information from FIG. 4 reflects that call waiting is available on the modem line. If call waiting is available on that line, then a duplicate dial string is provisioned (706) with both ICW and call-waiting-cancellation feature codes. Thereafter, a message 1502, similar to that shown in FIG. 15, is displayed (716), which indicates that the setup process is complete, and the ICW client application 120 is then launched (718) at the callee client 202. Once the ICW client is launched (718) the process continues to FIG. 16.

If the information reflects that only one dial access number is available and call waiting is not available on the modem line, then a duplicate dial string is provisioned (708) with only the ICW feature code. Thereafter, a message 1502, similar to that shown in FIG. 15, is displayed (716), which indicates that the setup process is complete, and the ICW client application 120 is then launched (718) at the callee client 202. Once the ICW client is launched (718) the process continues to FIG. 16.

If the information reflects that more than one dial access number is available, then the callee client further determines (710) whether the stored information from FIG. 4 reflects that call waiting is available on the modem line. If call waiting is available on that line, then duplicate dial strings for all of the stored numbers are provisioned (712) with both ICW and call-waiting-cancellation feature codes. Thereafter, a message 1502, similar to that shown in FIG. 15, is displayed (716), which indicates that the setup process is complete, and the ICW client application 120 is then launched (718) at the callee client 202. Once the ICW client is launched (718) the process continues to FIG. 16.

If the information reflects that more than one dial access number is available and call waiting is not available on the modem line, then duplicate dial strings for all of the stored numbers are provisioned (714) with only the ICW feature code. Thereafter, a message 1502, similar to that shown in FIG. 15, is displayed (716), which indicates that the setup process is complete, and the ICW client application 120 is then launched (718) at the callee client 202. Once the ICW client is launched (718) the process continues to FIG. 16.

Figure 16:
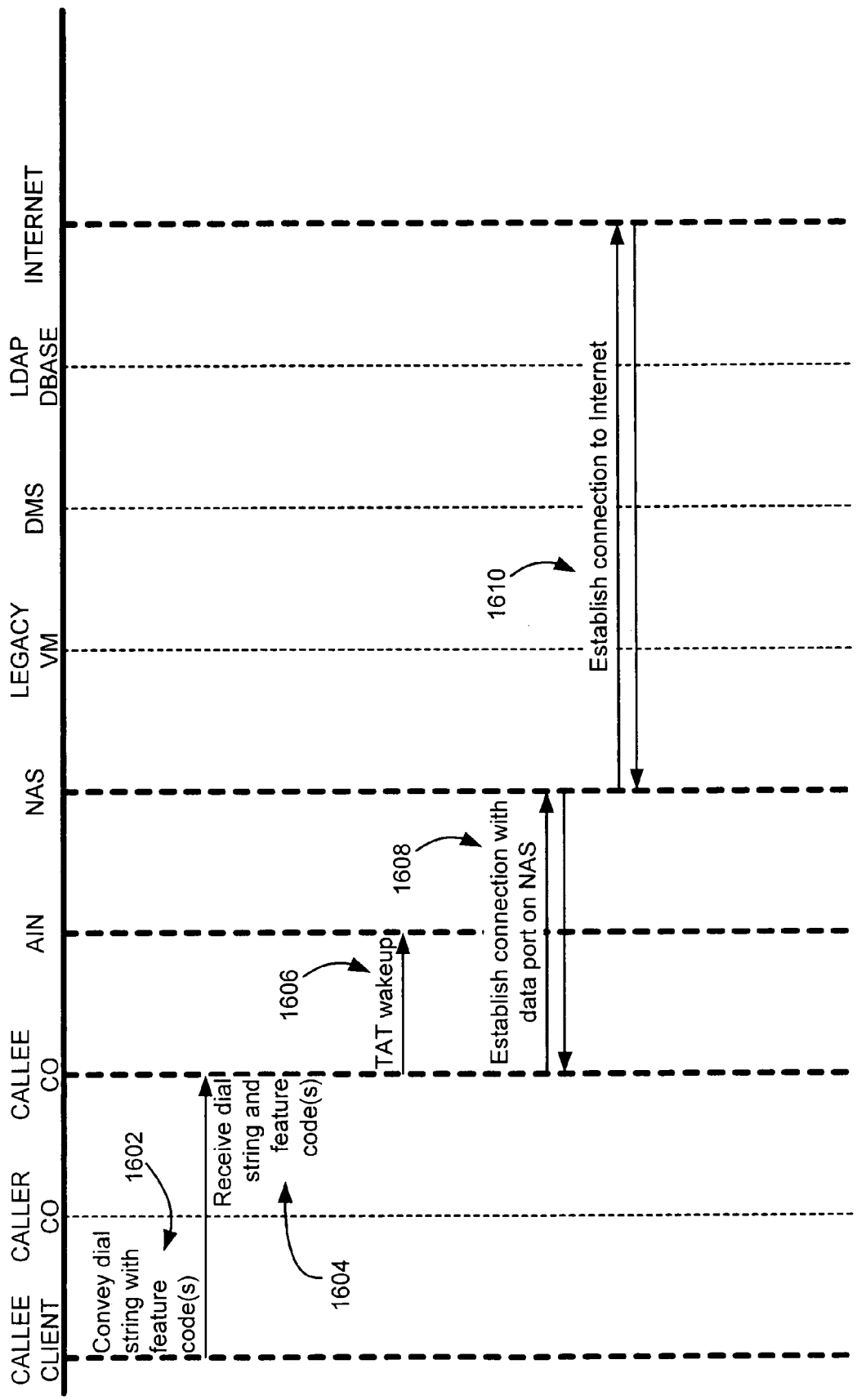
FIG. 16 is a data flow diagram showing one embodiment, among others, of an initial stage of the flow of data between the various system components of FIG. 2 for Internet call waiting (ICW).
Figure 17:
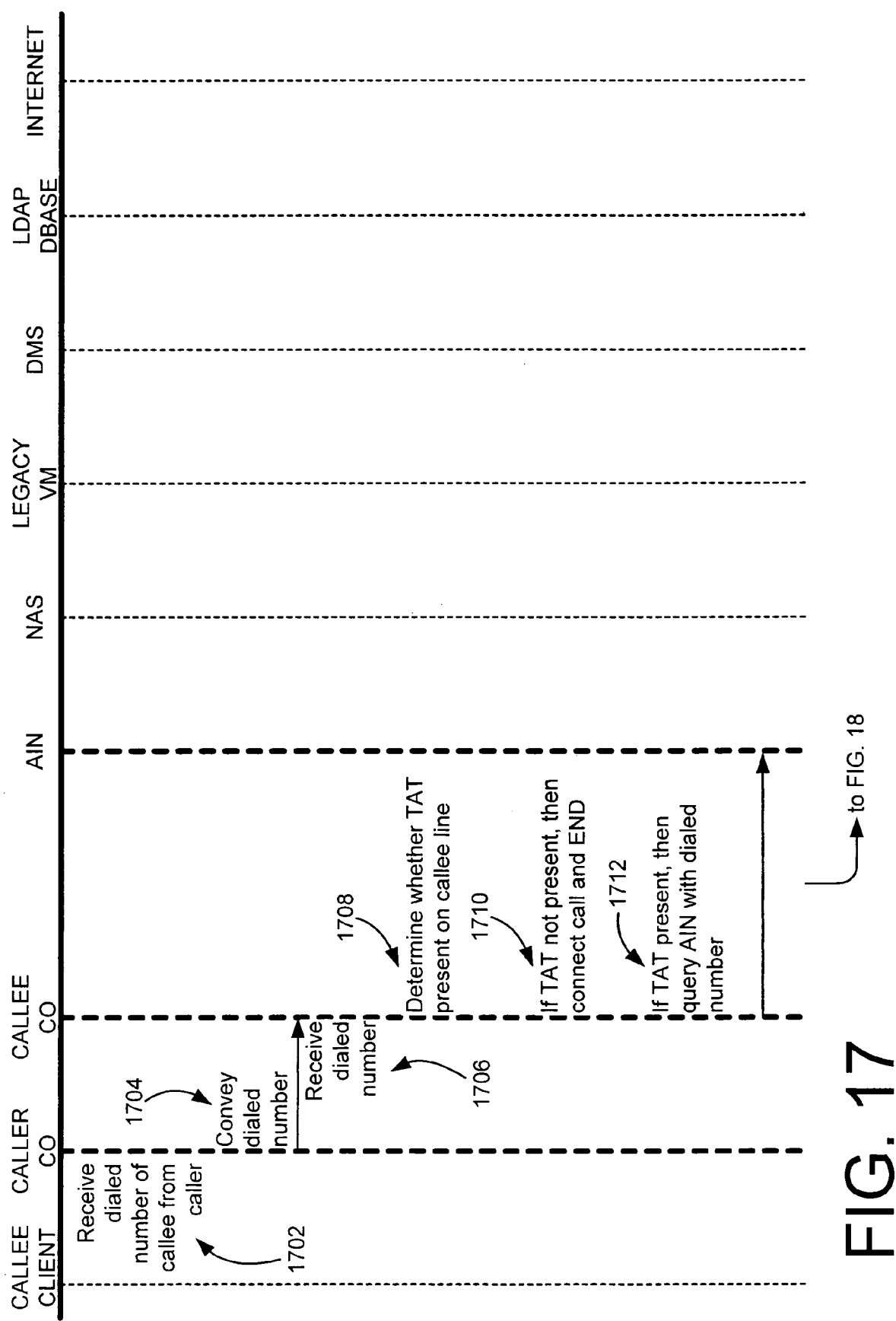
FIG. 17 is a data flow diagram showing an embodiment of a process continuing from FIG. 16.
Figure 18:
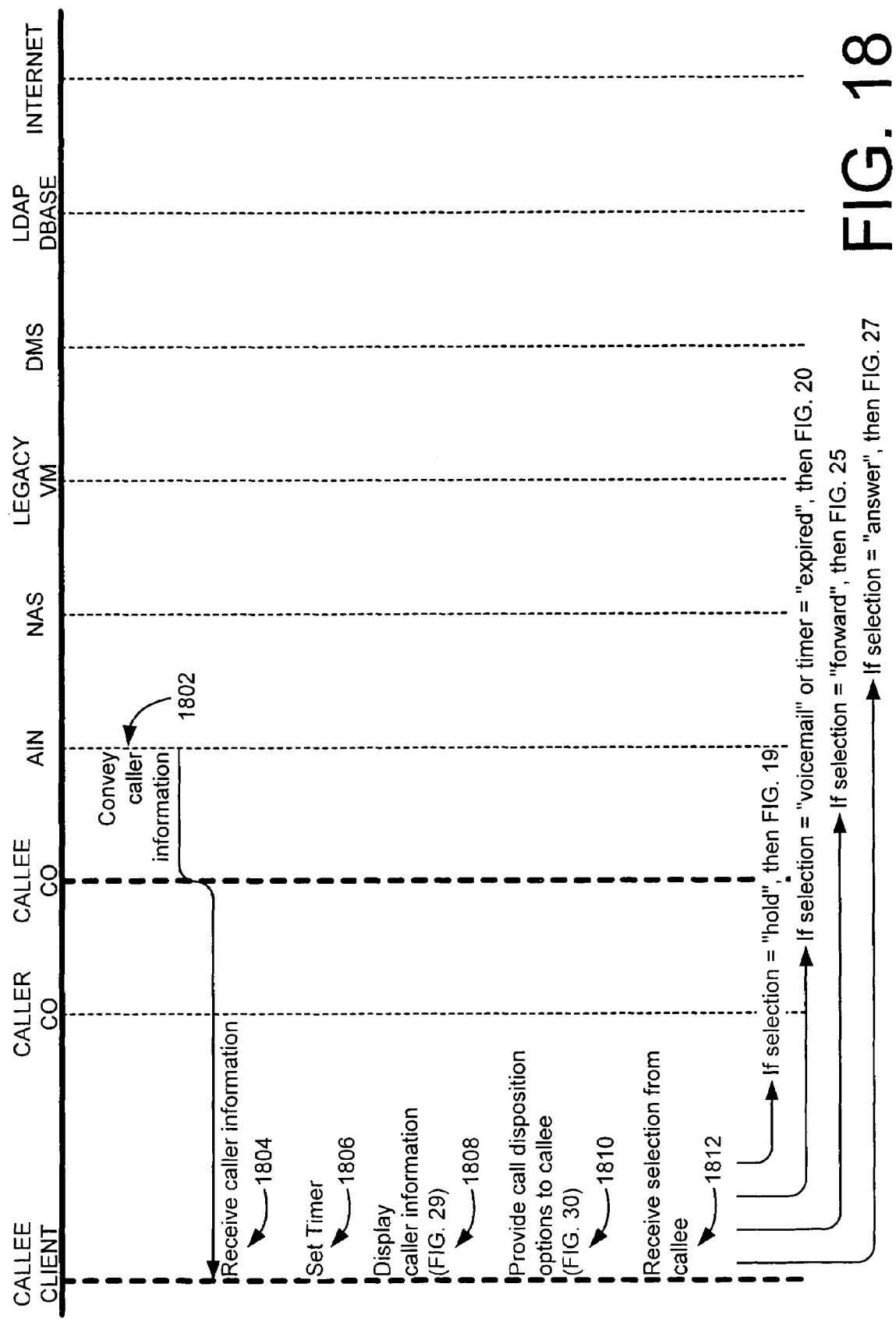
FIG. 18 is a data flow diagram showing an embodiment of a process continuing from FIG. 17.
Figure 27:
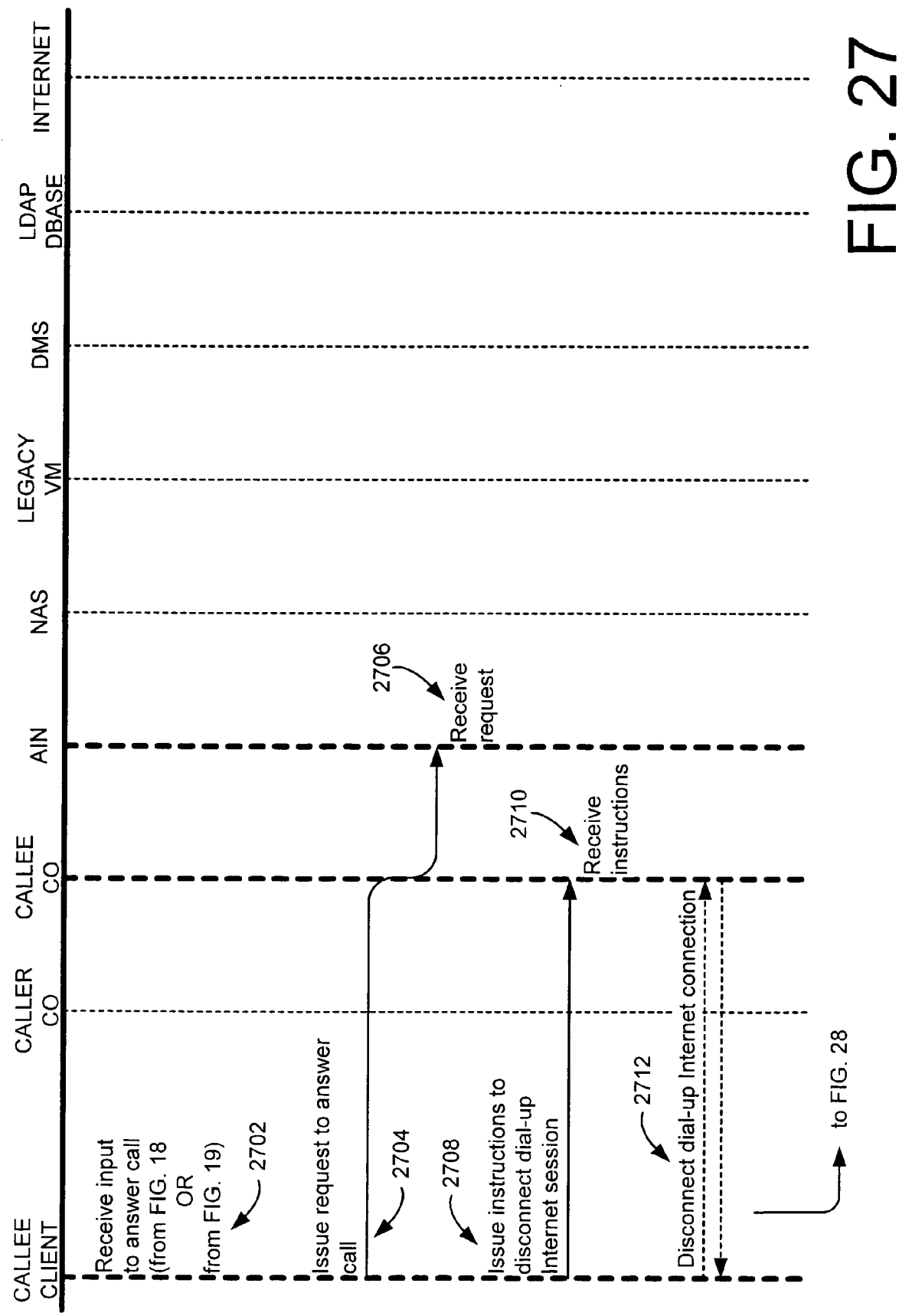
FIG. 27 is a data flow diagram showing another embodiment, among others, of the flow of data between the various system components of FIG. 2 when a callee answers an incoming call from a caller on hold, as shown in FIGS. 18 and 19.
Figure 28:
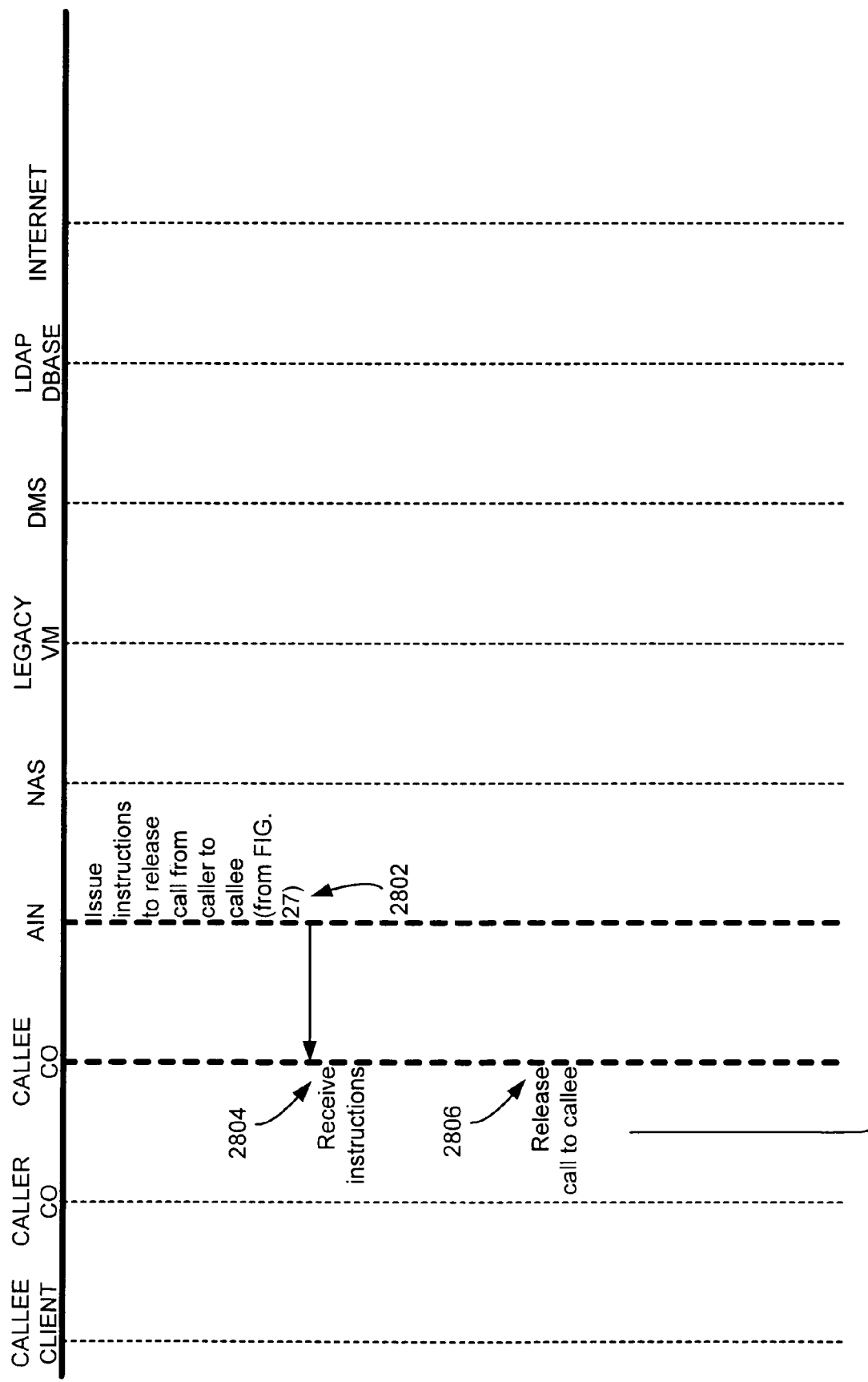
FIG. 28 is a data flow diagram showing an embodiment of a process continuing from FIG. 27
Figure 29:
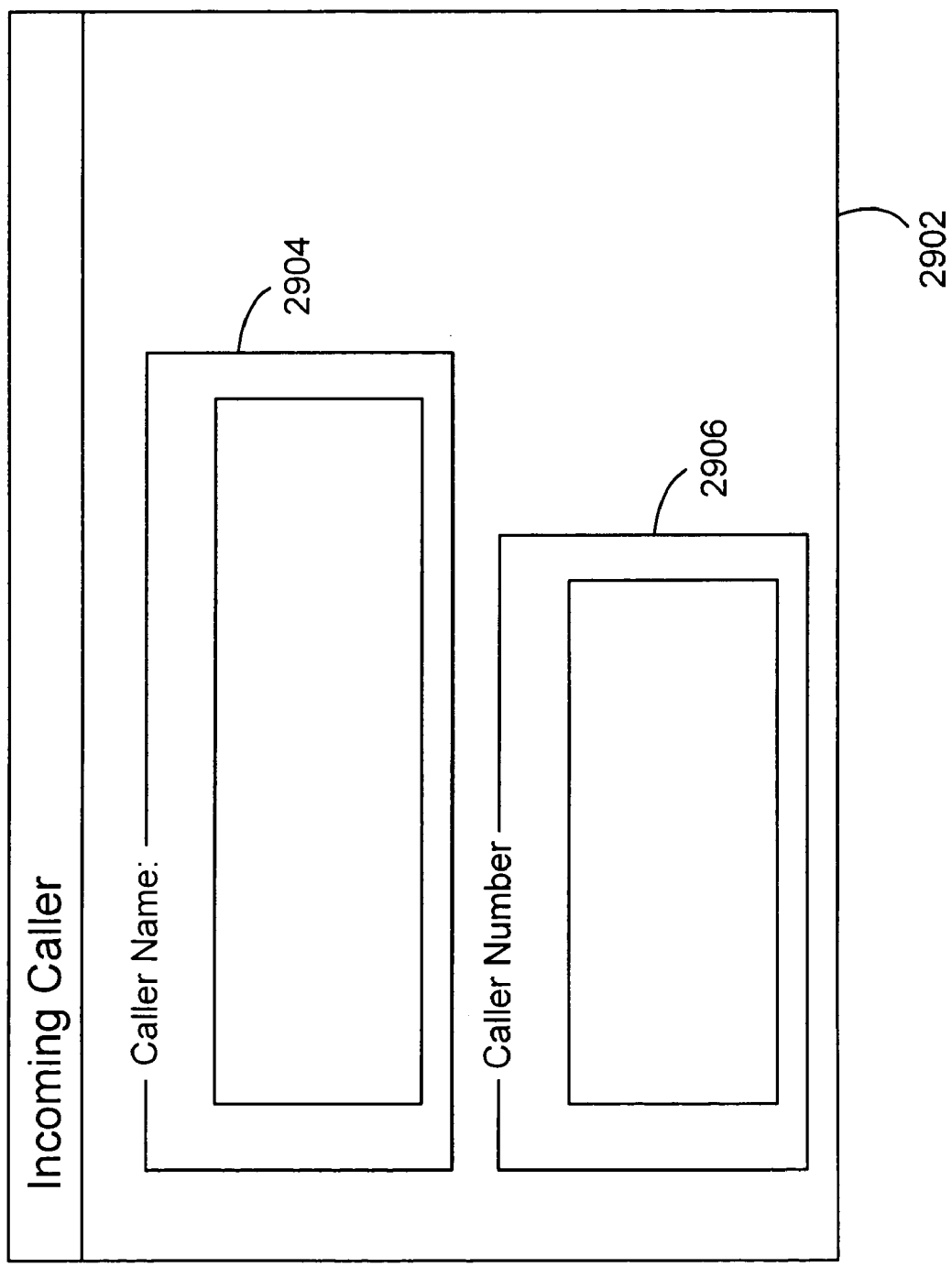
FIG. 29 is a diagram showing an embodiment of a user interface that can be presented to a user during the process shown in FIGS. 18 through 28.
Figure 30:
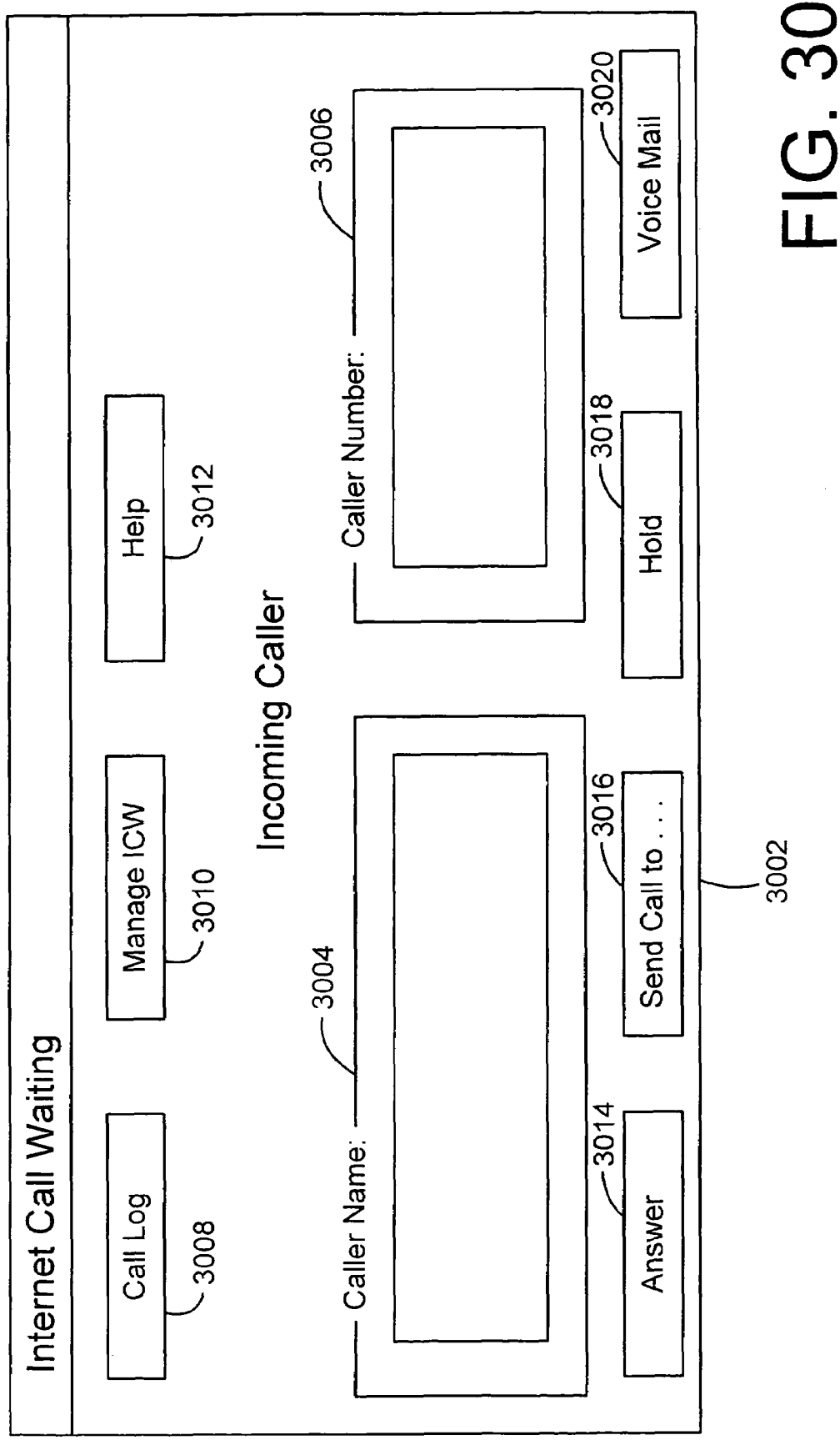
FIG. 30 is a diagram showing an embodiment of another user interface that can be presented to a user during the process shown in FIGS. 18 through 28.
Figure 31:
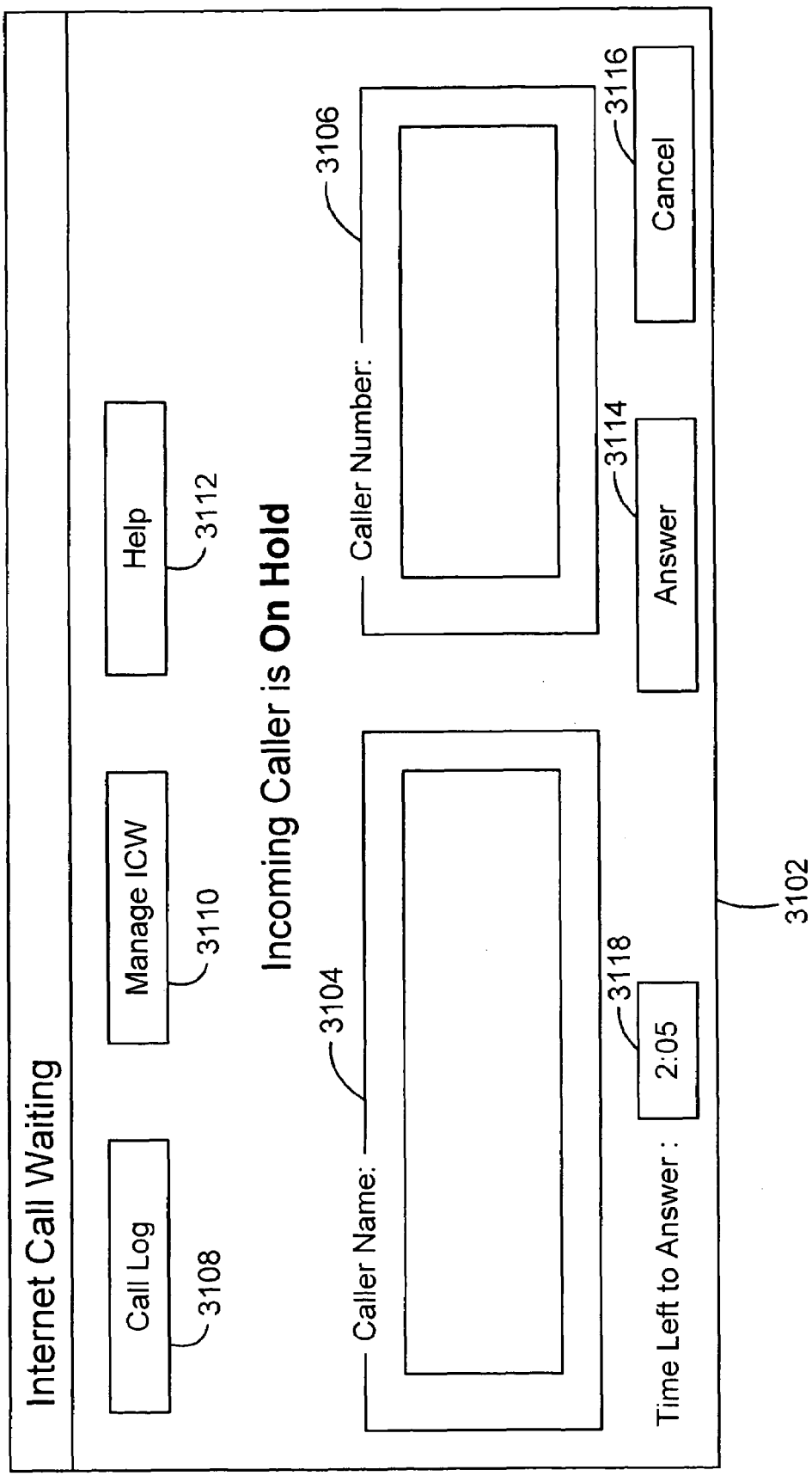
FIG. 31 is a diagram showing an embodiment of another user interface that can be presented to a user during the process shown in FIGS. 18 through 28.

FIGS. 16 and 17 are data flow diagrams showing one embodiment, among others, of the flow of data between the various system components of FIG. 2 for Internet call waiting (ICW), while FIGS. 29 through 31 are diagrams showing embodiments of user interfaces that can be presented to a user during the process shown in FIGS. 18 through 28. Specifically, FIG. 16 is a data flow diagram showing a connection to the Internet from a callee client 202 with the ICW client application 120 installed, and FIGS. 17 and 18 are data flow diagrams showing ICW processes upon receiving an incoming telephone call.

As shown in FIG. 16, upon launching the ICW client application 120, the callee client 202 conveys (1602) the dial string with one or more feature codes to the callee central office (CO) 204. The callee CO 204 receives (1604) the dial string with the feature code(s) and fires (1606) a termination attempt trigger (TAT) wakeup for Internet call waiting (ICW) to the advanced intelligent network (AIN) 220. Additionally, the callee CO 208 establishes (1608) a connection with the digital communication port on the network access server (NAS) 218. In some embodiments, the digital communication port is configured as a data port for receiving and transmitting digital data. The NAS 218 subsequently establishes (1610) a connection to the Internet 216. Thus, at the end of FIG. 16, a user has established a dial-up connection to the Internet. Additionally, at the end of FIG. 16, TAT for ICW has been activated.

It should be appreciated, after the ICW client application 120 has been properly set up and configured, that for some embodiments, the ICW client application 120 may be launched automatically during startup without additional user intervention. In other embodiments, the ICW client application 120 may be launched manually in response to user input.

When a caller places a telephone call to the callee (from either a public switched telephone network (PSTN) telephone or a cellular telephone), that call is ultimately routed to the callee CO 204 through known mechanisms. As shown in FIG. 17, the caller CO 208 receives (1702) the dialed number of the callee from the caller and conveys (1704) the dialed number to the callee CO 204. The callee CO 204 receives (1706) the dialed number and determines (1708) whether a TAT for ICW is present on the callee line. If the TAT for ICW is not present, then the call is connected (1710) and the process ends. If, however, the TAT for ICW is present, then the callee CO 204 queries (1712) the AIN 220 with the dialed telephone number, and the process continues to FIG. 18.

As shown in FIG. 18, the AIN 220 conveys (1802) the caller information to the callee client 202 through the callee CO 204. The callee client 202 receives (1804) the caller information and displays (1808) the caller information at a caller information user interface 2902, such as that shown in FIG. 29. As shown in FIG. 29, in some embodiments, the caller information user interface 2902 includes the caller's name 2904 and the caller's telephone number 2906. The callee client 202 also sets (1806) a timer, which tracks the amount of time that elapses from the receiving (1804) of the caller information. In addition to the caller information, the callee client 202 provides (1810) call disposition options to the callee through a call disposition user interface 3002, such as that shown in FIG. 30. As shown in FIG. 30, the call disposition user interface 3002 includes the caller name 3004 and the caller number 3006. Additionally, the call disposition user interface 3002 includes call disposition options, such as, for example, options to answer the call 3014 (hereinafter "the answer option"), send the call to another number 3016 (hereinafter "the forward option"), request the caller to hold 3018 (hereinafter "the hold option"), or direct the telephone call to voicemail 3020 (hereinafter "the voicemail option"). Also, the call disposition user interface 3002 includes additional options such as, for example, an option to view a call log 3008, an option to manage the ICW client application 3010, and an option to view a help screen 3012.

When a user selects one of the call disposition options 3014, 3016, 3018, 3020, the callee client 202 receives the user's selection. If the user has selected the hold option 3018, then the process continues to FIG. 19. If the user has selected the voicemail option 3020, then the process continues to FIG. 20. If the user has selected the forward option 3016, then the process continues to FIG. 25. If the user has selected the answer option 3014, then the process continues to FIG. 27.

Figure 19:
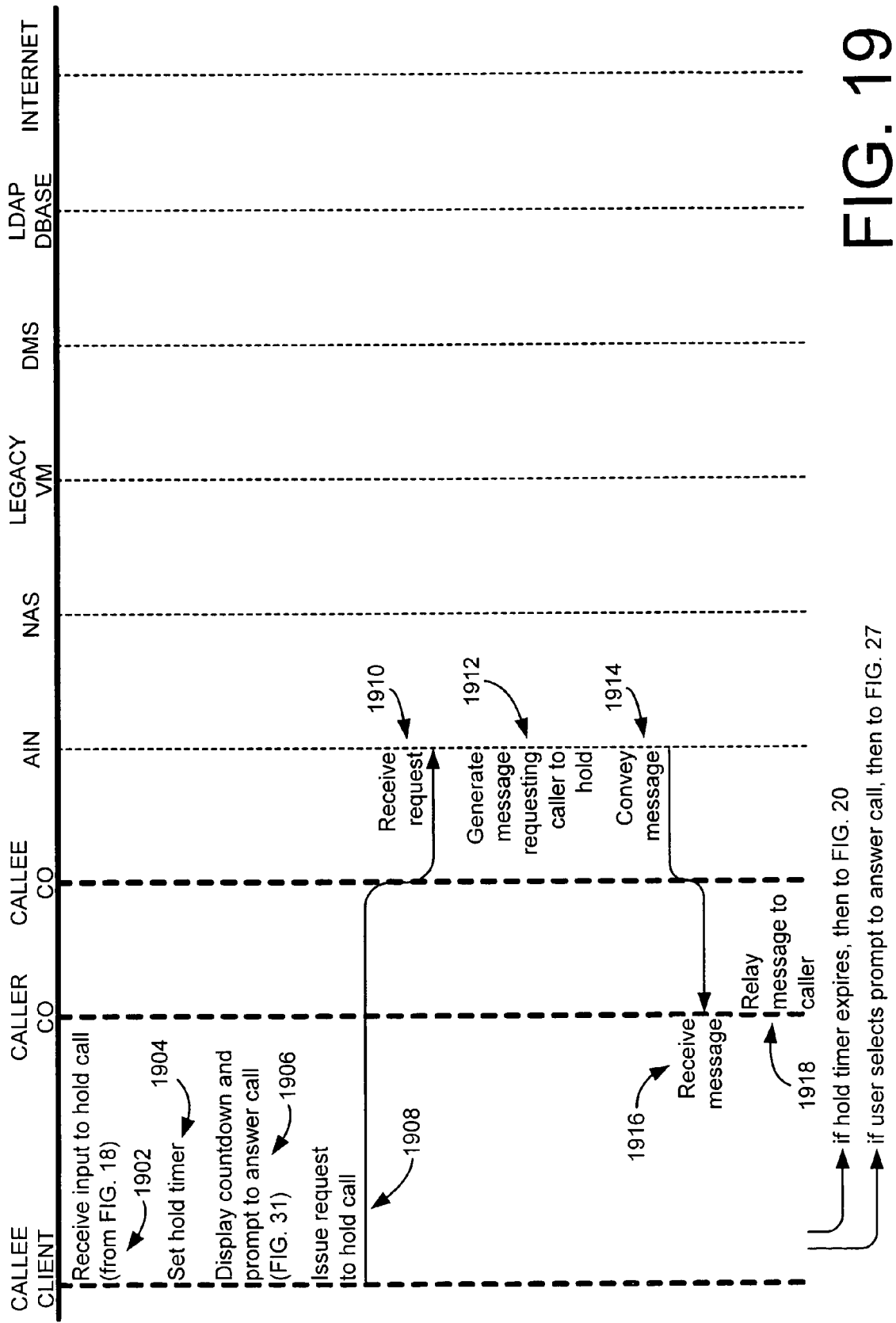
FIG. 19 is a data flow diagram showing one embodiment, among others, of the flow of data between the various system components of FIG. 2 when a callee places a caller on hold, as shown in FIG. 18.

FIGS. 19, 20 through 24, and 26 are data flow diagrams showing one embodiment, among others, of the flow of data between the various system components of FIG. 2 when a callee places a caller on hold, as shown in FIG. 18. As shown in FIG. 19, the callee client 202 receives (1902) the input to hold the call from the user. Upon receiving (1902) the input to hold the call, the callee client 202 sets (1904) a hold timer and displays (1906) a countdown that corresponds to the elapsing of time on the hold timer. In some embodiments, among others, the display may be a user countdown user interface 3102, such as that shown in FIG. 31. As shown in FIG. 31, the countdown user interface 3102 displays a caller name 3104 and a caller number 3106. Additionally, the countdown user interface 3102 displays a countdown timer 3118 that indicates the amount of time that a user has to answer the held telephone call before the held telephone call expires. The countdown user interface 3102 also includes a call answer selection 3114 that allows the callee to answer the held telephone call any time before the countdown timer 3118 expires. The countdown user interface 3102 can also include additional options such as, for example, an option to view a call log 3108, an option to manage the ICW client application 3110, and an option to view a help screen 3112.

Once the hold timer is set (1904) and the countdown is displayed (1906), the callee client 202 issues (1908) a request to the AIN 220 to hold the incoming telephone call for a predefined time interval. In some embodiments, the predefined time interval may be 150 seconds. It should, however, be appreciated that the predefined time interval may be adjusted, as desired. The AIN 220 receives (1910) the request and generates (1912) a message requesting the caller to hold. That message is, preferably, an audio message that is played in near real time to the caller through the PSTN 204. Thus, in operation, the message is conveyed (1914) to the caller CO 208 through the callee CO 204. The caller CO 208 receives (1916) the message and relays (1918) the message to the caller at the caller telephone 210. As the caller is holding, if the user selects the call answer selection 3114, then the process continues to FIG. 27. Alternatively, if the hold timer expires, then the process continues to FIG. 20.

Figure 20:
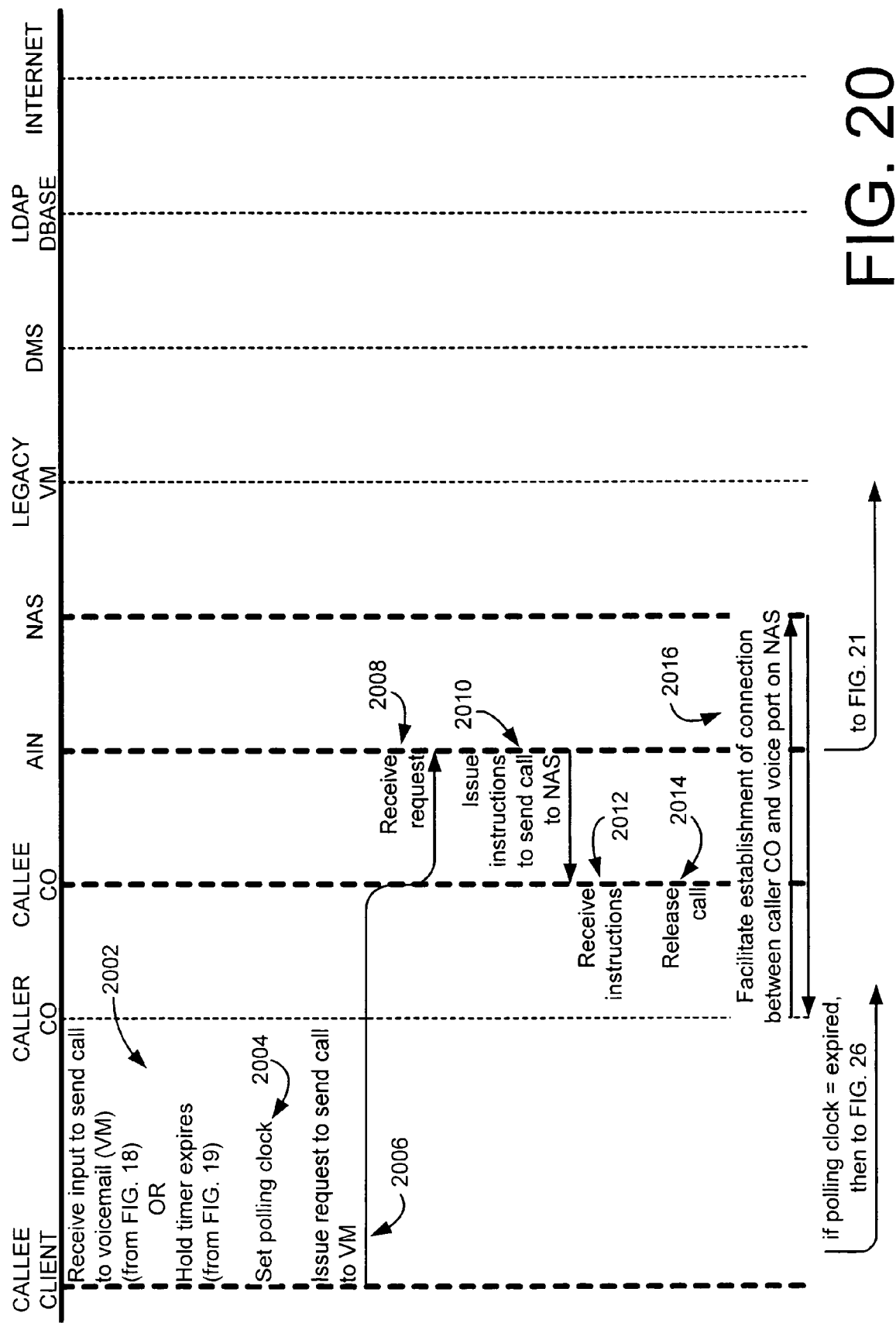
FIG. 20 is a data flow diagram showing an embodiment of a process continuing from FIG. 18 or 19.

As shown in FIG. 20, when the hold timer expires (or when the callee client 202 receives input to send the call to voicemail), the callee client 202 sets (2004) a polling clock. Upon setting the polling clock, the callee client 202 issues (2006) a request the AIN 220 to send the held call to voicemail. The AIN 220 receives (2008) the request and issues (2010) instructions to the callee CO 204 to send the call to NAS 218. The callee CO 204 receives (2012) the instructions and releases (2014) the call. Substantially synchronous with the releasing (2014) of the call, the callee CO 204 facilitates (2016) the establishing of a connection between the caller CO 204 and the analog voice communication port of the NAS 218. Specifically, the callee CO 204 dials the analog voice port of the NAS 218, relays the connection to the caller CO 208 through a switch-hook-flash, as is known in the art, and disconnects after establishing the connection between the NAS 218 and the caller CO 208. The process then continues to FIG. 21.

Figure 21:
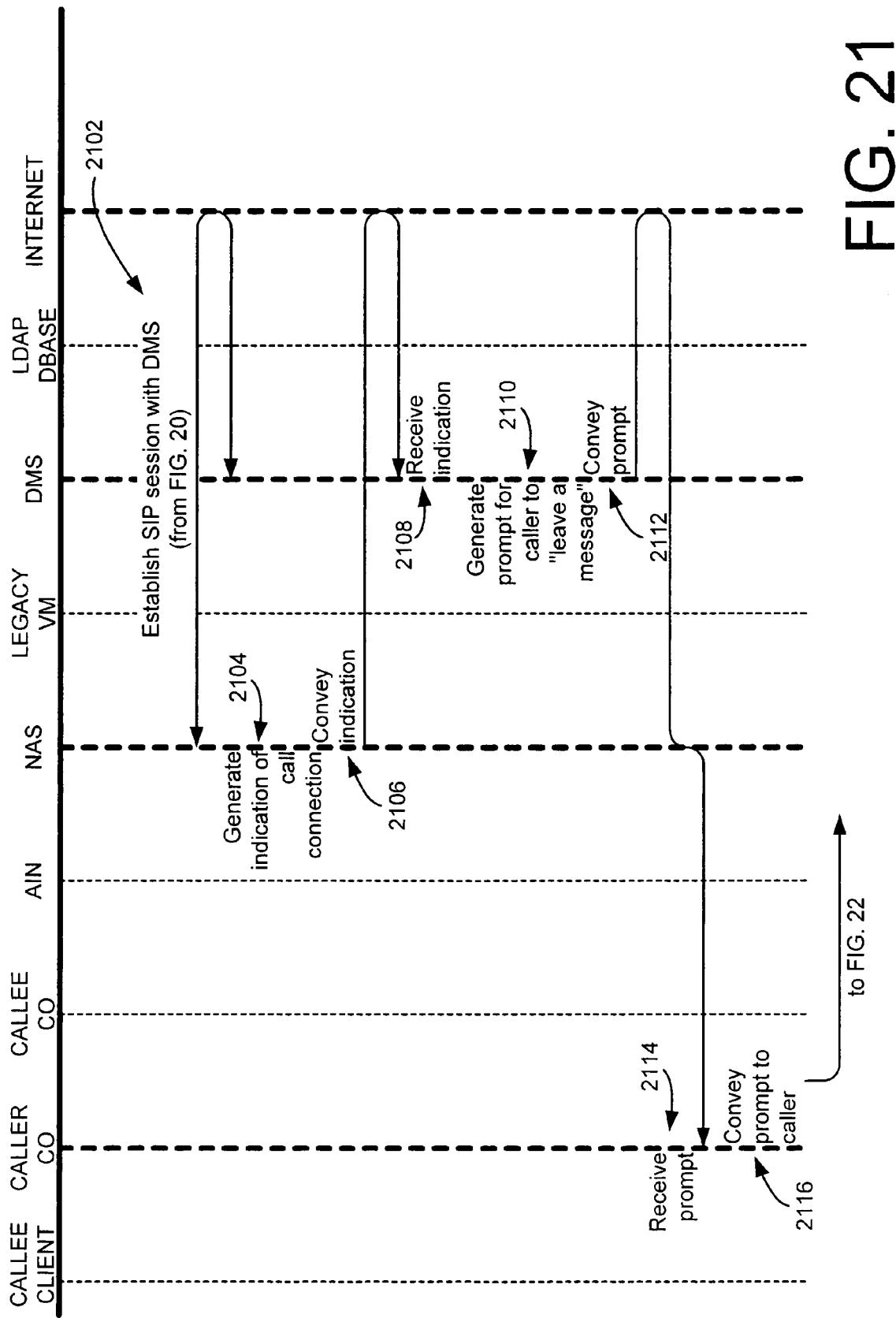
FIG. 21 is a data flow diagram showing an embodiment of a process continuing from FIG. 20.

As shown in FIG. 21, upon establishing (2016) a connection with the analog voice communication port, the NAS 218 further establishes (2102) a session initiation protocol (SIP) session with the digital messaging server (DMS) 214 over the Internet 216. Since SIP is known by those having skill in the art, further discussion of the specifics of SIP is omitted here. Upon establishing (2102) the SIP session with the DMS 214, the NAS generates (2104) an indication of the call connection. This indication is conveyed (2106) to the DMS 214 over the Internet 216. The DMS 214 receives (2108) the indication and generates (2110) a prompt to the caller to "leave a message." That prompt is conveyed (2112) to the caller CO 208 over the Internet 216 and through the NAS 218. The caller CO 208 receives (2114) the prompt and conveys (2116) the prompt to the caller. In one embodiment, among others, the prompt to the caller is played in real time over the Internet 216 and the PSTN 204. In some embodiments, the prompt is generated as digital data, conveyed from the DMS 214 to the NAS 218 as digital data, converted to analog signals by the NAS 218, and conveyed from the NAS 218 to the caller CO 208 as analog signals. Once the prompt is played to the caller, the process continues in FIG. 22.

Figure 22:
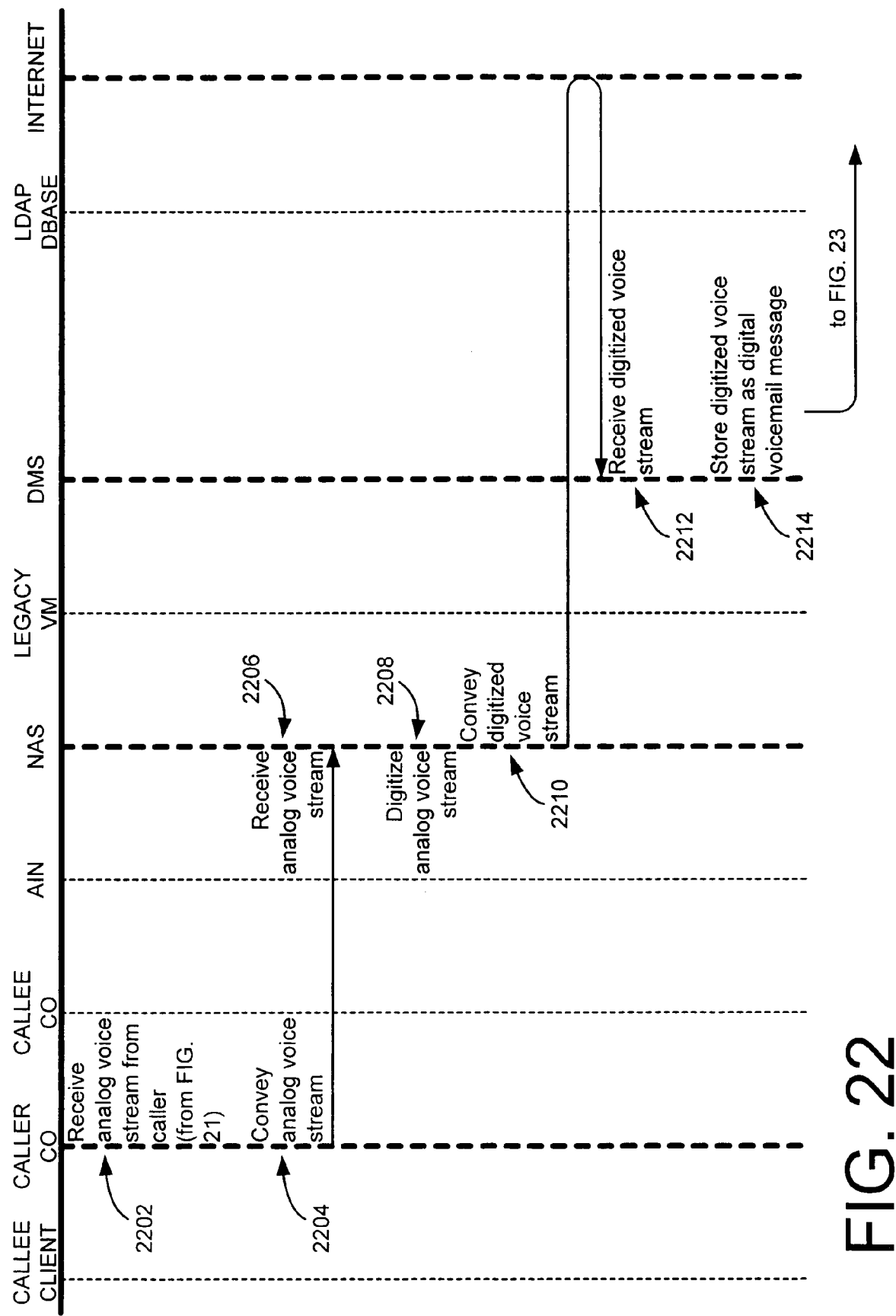
FIG. 22 is a data flow diagram showing an embodiment of a process continuing from FIG. 21.

As shown in FIG. 22, in response to the prompt from the AIN 220, the caller records a message for the callee. In operation, the caller CO 208 receives (2202) the analog voice stream from the caller and conveys (2204) the analog voice stream to the analog voice communication port of the NAS 218. The NAS 218 receives (2206) the analog voice stream and digitizes (2208) the analog voice stream. The digitized voice stream is conveyed (2210) from the digital communication port of the NAS 218 to the DMS 214 via the Internet 216. The DMS 214 receives (2212) the digitized voice stream and stores (2214) the digitized voice stream as a digital voicemail message. The process continues in FIG. 23.

Figure 23:
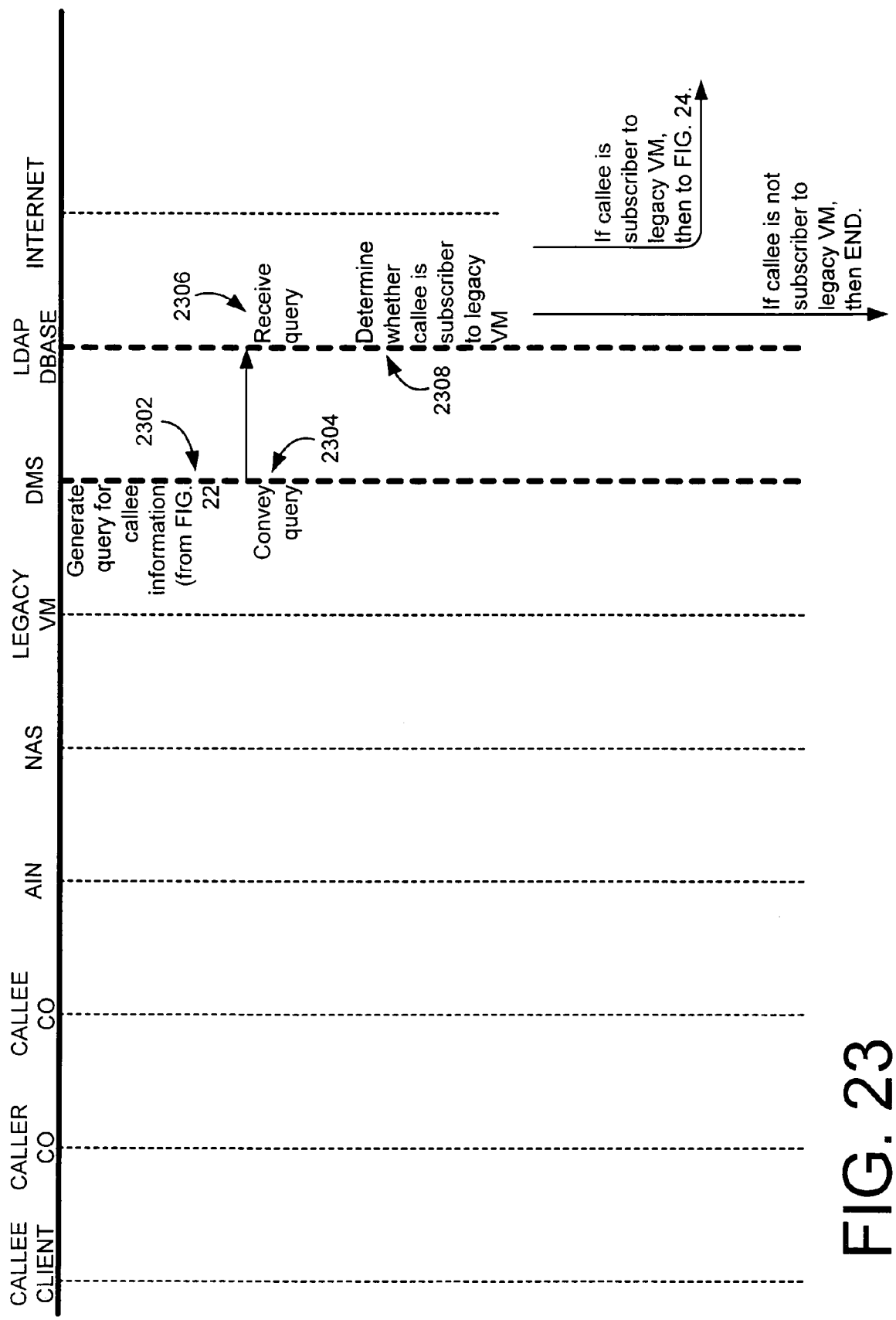
FIG. 23 is a data flow diagram showing an embodiment of a process continuing from FIG. 22.

As shown in FIG. 23, upon storing (2214) the digitized voice stream, the DMS 214 queries the lightweight directory access protocol (LDAP) database 232 to determine whether the callee is a subscriber to a legacy voicemail system. In operation, the querying process may be seen as beginning with a generating (2302) of a query for callee information. The DMS 214 conveys (2304) the query to the lightweight directory access protocol (LDAP) database 232. The LDAP database 232 receives (2306) the query. It is then determined (2308) whether or not the callee is a subscriber to a legacy voicemail system. In other words, it is determined whether or not the callee has a legacy voicemail repository. If the callee does not have a legacy voicemail repository, then the process ends. If, however, the callee has a legacy voicemail repository, then the process continues to FIG. 24.

Figure 24:
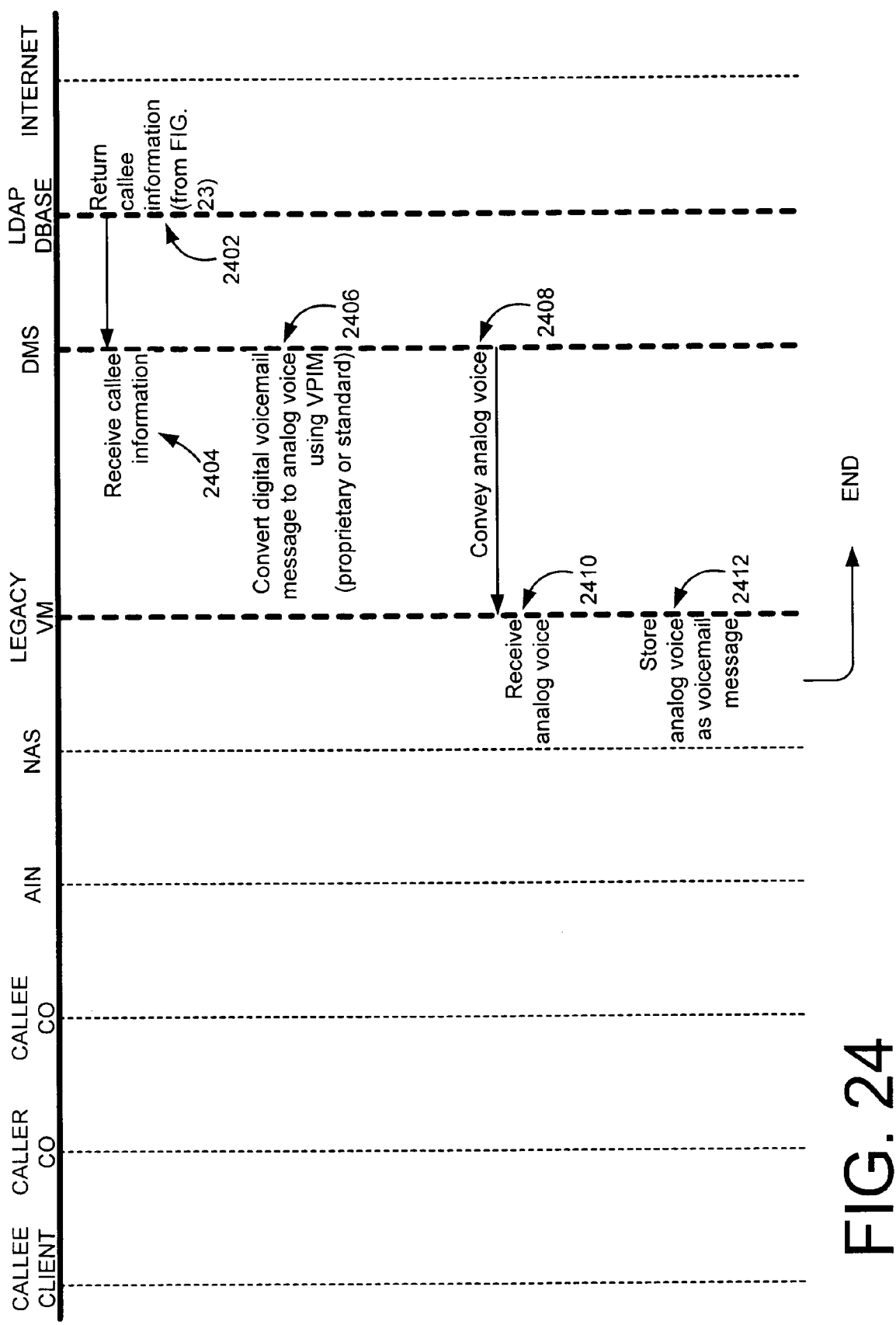
FIG. 24 is a data flow diagram showing an embodiment of a process continuing from FIG. 23.

As shown in FIG. 24, the callee information is returned (2402) from the LDAP database 232 to the DMS 214. The DMS 214 receives (2404) the callee information and converts (2406) the digital voicemail message into an analog voicemail message using voice profile for Internet mail (VPIM). Since VPIM is described in RFC 2421, RFC 2422, RFC 2423, and RFC 2424, published by the Internet Engineering Task Force (IETF), further discussion of VPIM is omitted here. However, it should be appreciated that the digital voicemail message can also be converted into an analog voicemail message using other proprietary and/or non-proprietary techniques.

The DMS 214 conveys (2408) the analog voicemail message to the legacy voicemail repository 230. The legacy voicemail repository 230 receives (2410) the analog voicemail message and stores (2412) the analog voicemail message. As shown in FIGS. 21 through 24, the voicemail message from the caller is stored at both the DMS 214, in digital format, and at the legacy voicemail repository 230, in accordance with the protocols of the legacy voicemail system. Specifically, in the embodiment of FIGS. 21 through 24, both the digital and analog voicemail messages are stored substantially synchronously because the NAS performs a near-real time digital-to-analog and analog-to-digital conversion.

Once the analog voicemail message is stored at the legacy voicemail repository, and the digital voicemail message is stored at the DMS 214, the voicemail messages can be retrieved. FIG. 26 shows an embodiment in which the stored digital voicemail message in the DMS 214 is retrieved by the callee client 202. As shown in FIG. 26, when the polling clock from FIG. 20 expires, the callee client 202 polls (2602) the DMS 214, via the Internet 216, for new digital voicemail messages. If the DMS 214 has any new digital voicemail messages, then the DMS 214 sends (2604) those digital voicemail messages to the callee client 202 over the Internet 216. The callee client 202 receives (2606) the digital voicemail messages and issues (2608) an acknowledgement back to the DMS 214 when the voicemail message is completely received (or downloaded). The DMS 214 receives (2610) the acknowledgement and, in response to the acknowledgement, expunges (2616) the digital voicemail message. After issuing (2608) the acknowledgement, the callee client 202 generates (2612) an alert to the user, thereby indicating the retrieval of a new digital voicemail message. The callee client 202 then logs (2614) the new voicemail message and, thereafter, the process terminates.

As shown in FIG. 27, the callee client 202 receives (2702) an input to answer the call. Upon receiving (2702) the input, the callee client 202 issues (2704) a request to the AIN 220 to answer the call. The AIN receives (2706) the request. Substantially synchronous with the issuing (2704) of the request to answer the telephone call, the callee client 202 issues (2708) instructions to the callee CO 204 to disconnect the dial-up Internet session. The callee CO 204 receives (2710) the instructions and, in response to the instructions, the dial-up Internet connection is disconnected (2712). The process then continues to FIG. 28.

As shown in FIG. 28, the AIN 220 issues (2802) instructions to the callee CO 204 to release the call from the caller. The callee CO 204 receives (2804) the instructions and releases (2806) the telephone call, thereby connecting the caller with the callee in accordance with known methods. Thereafter, the process terminates. Since the operation of the system in response to the user's selection to answer the telephone call is known in the art, further discussion of the operation of the callee CO 204, the AIN 220, and the callee client 202 is omitted with reference to FIGS. 27 and 28.

Figure 25:
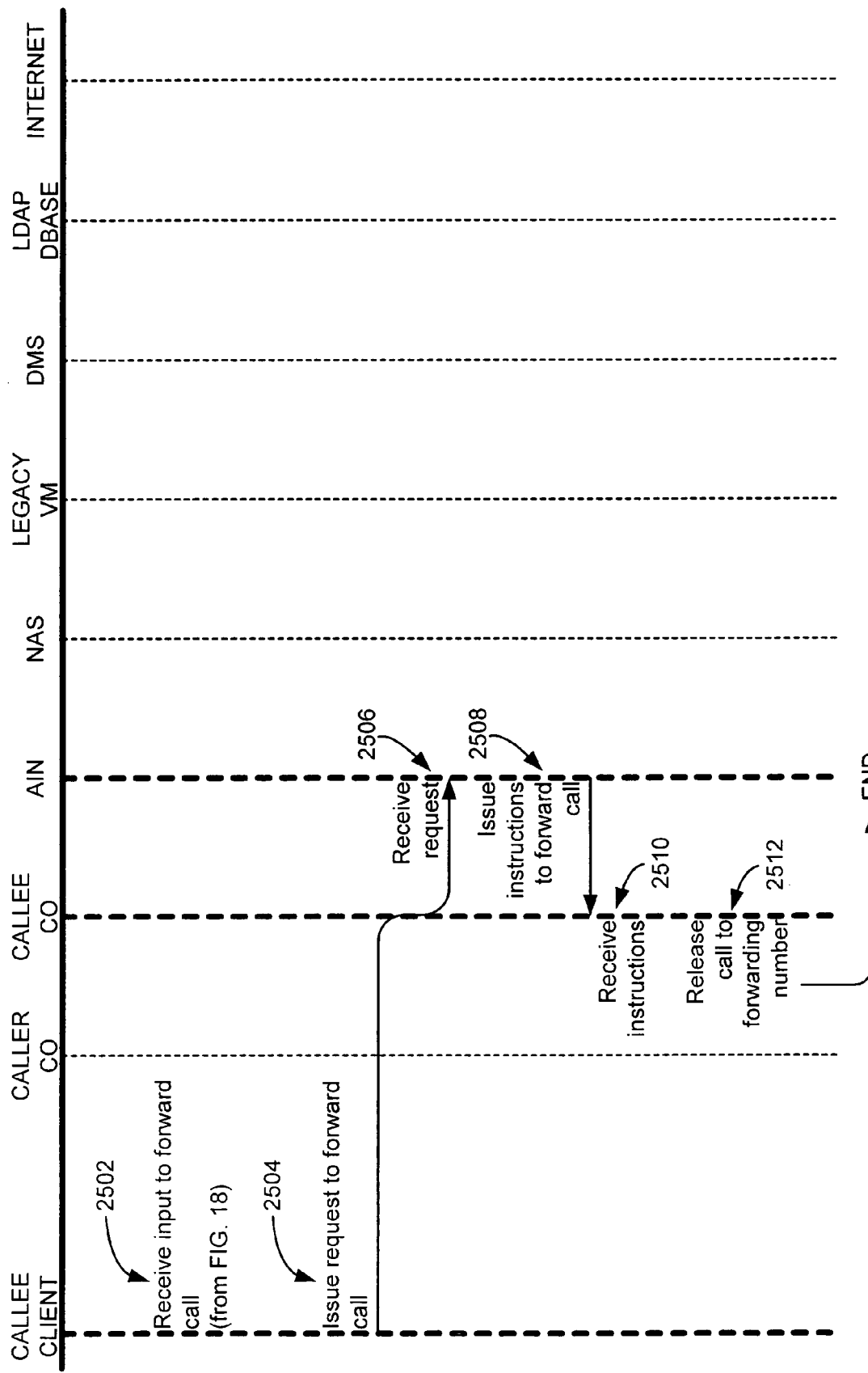
FIG. 25 is a data flow diagram showing one embodiment, among others, of the flow of data between the various system components of FIG. 2 when a callee forwards an incoming call from a caller to another telephone number, as shown in FIG. 18.

FIG. 25 is a data flow diagram showing one embodiment, among others, of the flow of data between the various system components of FIG. 2 when a callee forwards an incoming call from a caller to another telephone number, as shown in FIG. 18. As shown in FIG. 25, the callee client 202 receives 2502 the input to forward a call and issues (2504) a request to the AIN 220, through the callee CO 204. The request includes the forwarding number to which the telephone call should be forwarded. The AIN 220 receives (2506) the request and issues (2508) instructions to the callee CO 204 to forward the call to the forwarding number. The callee CO 204 receives (2510) the instructions and releases (2512) the call to the forwarding number. Thereafter the process terminates. Since the call forwarding process of FIG. 25 is known in the art, further discussion of the call forwarding process is omitted here.

The logic components within various system components of FIG. 2 (e.g., the callee client 202, the network access server (NAS)/session initiation protocol (SIP) server 218, the digital messaging server (DMS) 214, the Internet gateway 222, the lightweight directory access protocol (LDAP) database), the Internet call waiting (ICW) service package application (SPA)) may be implemented in hardware, software, firmware, or a combination thereof. In the preferred embodiment(s), those logic components are implemented in software or firmware that is stored in a memory and that is executed by a suitable instruction execution system. If implemented in hardware, as in an alternative embodiment, those logic components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The Internet call waiting (ICW) application 120, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while the NAS 218 and the SIP server 218 are shown as a single component, it should be appreciated that the functionality of the NAS 218 and the SIP server 218 may be separated into two distinct servers. Likewise, while the DMS 214 and the SIP server 214 are shown as a single component, it should be appreciated that the functionality of the DMS 214 and the SIP server 214 may be separated into two distinct components. Similarly, while the NAS/SIP server 218 and the DMS/SIP 214 are shown, conceptually, as separate distributed components in FIG. 2, it should be appreciated that the NAS/SIP server 218 and the DMS/SIP 214 may be housed at the same physical location. Hence, the same piece of hardware may perform the functions of both the NAS 218 and the DMS 214. In other words, it should be appreciated that the various components of FIG. 2 are shown as conceptually separate components, rather than as physically separate components.

Also, while the caller CO 208 and the callee CO 206 are conceptually shown as two separate entities, it should be appreciated that, depending on the physical location of both the caller and the callee, the caller CO 208 and the callee CO 206 may be one in the same. Moreover, while various servers (e.g., NAS/SIP server 218, DMS/SIP 214, etc.) are shown as being external to the Internet 216, it should be appreciated that these servers may be a component part of the Internet 216.

Additionally, while various embodiments are described with reference to specific, standard communication modalities, such as, for example, email, instant messaging (IM), Internet call waiting (ICW), legacy voicemail, public switched telephone network (PSTN) telephony, etc., it should be appreciated that the disclosed embodiments are intended to more clearly illustrate the operation of the systems and methods. Thus, the specifically enumerated communication systems are not intended as being limitations on the invention. In this regard, it should be appreciated that the present disclosure may be extended to cover other communication modalities, such as, for example, cellular telephony, satellite telephony, etc.

Similarly, the various known protocols, among others, associated with the communication systems are generically referred to as standard communication protocols. Thus, it should be appreciated that a known email protocol, such as, for example, post office protocol 3 (POP3), is an example of a standard communication protocol. Likewise, it should be appreciated that a known PSTN protocol is another example of a standard communication protocol. Similarly, it should be appreciated that other Internet-based protocols, such as, for example, voice-over Internet protocol (VoIP) and session initiation protocol (SIP), are yet other examples of standard communication protocols.

These, and other changes, modifications, and alterations, should therefore be seen as within the scope of the disclosure.

What is claimed is:

1. A system for storing messages using multiple communication modalities, the system comprising:
   (A) a standard telephone system;
   (B) a standard legacy voicemail system;
   (C) a digital voicemail store configured to receive digitized messages, the digital voicemail store further being configured to store digitized messages;
   (D) a network access server (NAS) comprising:
      (D1) an NAS analog voice port communicatively coupled to the standard telephone system, the NAS analog voice port being configured to receive analog voice signals from the standard telephone system;
      (D2) an analog-to-digital (A/D) converter configured to digitize the analog voice signals; and
      (D3) an NAS digital port configured to transmit the digitized signals; and
   (E) a digital messaging server (DMS) comprising:
      (E1) a DMS digital port communicatively coupled to the NAS digital port, the DMS digital port further being communicatively coupled to the digital voicemail store, the DMS digital port being configured to receive the digitized signals from the NAS digital port, the DMS digital port further being configured to convey the digitized message to the digital voicemail store;
      (E2) a digital-to-analog (D/A) converter configured to convert the digitized signal into an analog message; and
      (E3) a DMS analog port communicatively coupled to the standard legacy voicemail system, the DMS analog voice port being configured to convey the analog message to the standard legacy voicemail system.

2. The system of claim 1, wherein the DMS is further configured to provide a temporary digital mailbox.

3. The system of claim 2, wherein the temporary digital mailbox is configured to store at least one digital message.

4. The system of claim 2, wherein the DMS is further configured to destroy the temporary digital mailbox.

5. The system of claim 1, wherein the DMS is further configured to convert the digitized data into Internet-compatible data.

6. The system of claim 5, wherein the Internet-compatible data includes an attachment to an email message.

7. The system of claim 5, wherein the Internet-compatible data includes an attachment to an Instant Message.

8. The system of claim 5, wherein the Internet-compatible data includes a digital voice stream using Voice over Internet Protocol (VoIP).

* * * * *